United States Patent
Watanabe et al.

(10) Patent No.: US 8,906,989 B2
(45) Date of Patent: Dec. 9, 2014

(54) PRESSURE-SENSITIVE ADHESIVE LAYER AND PRESSURE-SENSITIVE ADHESIVE SHEET

(71) Applicant: Nitto Denko Corporation, Ibaraki-shi, Osaka (JP)

(72) Inventors: Natsuko Watanabe, Osaka (JP); Kazuma Mitsui, Osaka (JP); Tatsumi Amano, Osaka (JP); Kenjiro Niimi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 14/227,700

(22) Filed: Mar. 27, 2014

(65) Prior Publication Data

US 2014/0296401 A1   Oct. 2, 2014

(30) Foreign Application Priority Data

Mar. 29, 2013 (JP) ................................. 2013-073361
Dec. 3, 2013 (JP) ................................. 2013-249793

(51) Int. Cl.
  *C09J 11/06* (2006.01)
(52) U.S. Cl.
  CPC ...................................... *C09J 11/06* (2013.01)
  USPC ........................................................ 524/159

(58) Field of Classification Search
  CPC ....................................................... C09J 11/06
  See application file for complete search history.

(56) References Cited

FOREIGN PATENT DOCUMENTS

JP        2012-224811 A      11/2012
JP        2012224811 A    *  11/2012

* cited by examiner

*Primary Examiner* — Kelechi Egwim
(74) *Attorney, Agent, or Firm* — Sughrue Mion, PLLC

(57) ABSTRACT

A pressure-sensitive adhesive layer contains a base polymer and has properties of (1) and (2) below: in a case where a pressure-sensitive adhesive sheet A is laminated to an adherend X surface, they are left to stand at a temperature of 23° C. and a humidity of 30% for 12 hours, and the pressure-sensitive adhesive sheet A is then separated, (1) a water contact angle A on the adherend X surface from which the pressure-sensitive adhesive sheet A has been separated is 70° or less, and (2) a pressure-sensitive adhesive strength of a pressure-sensitive adhesive tape B with respect to the adherend X surface from which the pressure-sensitive adhesive sheet A has been separated is higher than that of the pressure-sensitive adhesive tape B with respect to the adherend X surface not subjected to any treatment.

8 Claims, No Drawings

PRESSURE-SENSITIVE ADHESIVE LAYER AND PRESSURE-SENSITIVE ADHESIVE SHEET

BACKGROUND OF THE INVENTION

1. Technical Field

The present invention relates to a pressure-sensitive adhesive layer and a pressure-sensitive adhesive sheet.

2. Background Art

Conventionally, during transporting an optical member or an electronic member or assembling a product, it has been commonly conducted to protect the surface of the optical member or the like with a surface protective sheet so as not to cause a stain or a scratch on the surface of the optical member or the like. Examples of the surface protective sheet include a pressure-sensitive adhesive sheet having a pressure-sensitive adhesive property (Patent Document 1).

Patent Document 1: JP-A-2012-224811

SUMMARY OF THE INVENTION

The surface protective sheet is separated from the optical member when protection of the member surface becomes unnecessary, for example, after the completion of the transportation of the optical member. After the separation of the surface protective sheet, a layer (another layer) having another function or the like is sometimes provided on the adherend surface to which the surface protective sheet has been laminated. Depending on the condition of the adherend surface after separating the surface protective sheet, for example, wettability with the another layer may be deteriorated or contact (adhesion) of the another layer with the adherend may be insufficient, as a result, the function expected by the another layer may not be exerted or the product may become defective.

Specifically, in the case of providing another layer such as a layer having a touch panel function or a protective layer composed of glass or plastic on a liquid crystal display surface, when a surface protective sheet provided to protect the surface of a polarizing plate (for example, a polarizing plate in which the surface layer is a hardcoat layer) on the liquid crystal display surface is separated and thereafter, an interlayer filler is coated between the another layer and the polarizing plate surface on the liquid crystal display surface to provide a transparent layer, wettability of the polarizing plate surface with the interlayer filler or adherence between the polarizing plate surface and the interlayer filler is sometimes insufficient.

That is, a pressure-sensitive adhesive sheet ensuring that, in the case of separating a pressure-sensitive adhesive sheet (surface protective sheet) and then providing another layer on the adherend surface to which the pressure-sensitive adhesive sheet has been laminated, the adherend surface can be put into a state where wettability with the another layer and adherence between the adherend surface and the another layer are excellent, is not known at present.

Accordingly, an object of the present invention is to provide a pressure-sensitive adhesive layer capable of protecting an adherend surface from a stain or a scratch, and preventing, after the separation of surface a protective sheet, the adherence of the adherend surface with another laminating member such as interlayer filler from being impaired.

As a result of intensive studies, the present inventors have found that when a pressure-sensitive adhesive layer having properties capable of setting the water contact angle of the adherend surface after separating a pressure-sensitive adhesive sheet to fall in a specific range and capable of forming a pressure-sensitive adhesive sheet allowing for excellent adherence to a pressure-sensitive adhesive tape on the adherend surface after the separation of a pressure-sensitive adhesive sheet is used, in the case of separating the pressure-sensitive adhesive sheet and then providing another layer on the adherend surface to which the pressure-sensitive adhesive sheet has been laminated, the adherend surface can be put into a state where wettability with the another layer and adherence between the adherend surface and the another layer are excellent. The present invention has been accomplished based on this finding.

That is, the present invention provides the following pressure-sensitive adhesive layer and pressure-sensitive adhesive sheet.

<1> A pressure-sensitive adhesive layer, comprising a base polymer and having properties of (1) and (2) below:

(1) in a case where a pressure-sensitive adhesive sheet A having the pressure-sensitive adhesive layer is laminated to a surface of the following adherend X at a temperature of 23° C. and a humidity of 30%, the pressure-sensitive adhesive sheet A is then tightly adhered to the adherend X in an autoclave under the conditions of a temperature of 50° C., a pressure of 5 atm and a time of 15 minutes, the pressure-sensitive adhesive sheet A and adherend X, that have been tightly adhered to each other, is then left to stand at a temperature of 23° C. and a humidity of 30% for 12 hours, and then, the pressure-sensitive adhesive sheet A is separated from the adherend X, a water contact angle A on the surface of the adherend X from which the pressure-sensitive adhesive sheet A has been separated is 70° or less; and (2) in a case where a pressure-sensitive adhesive sheet A having the pressure-sensitive adhesive layer is laminated to a surface of the following adherend X at a temperature of 23° C. and a humidity of 30%, the pressure-sensitive adhesive sheet A is then tightly adhered to the adherend X in an autoclave under the conditions of a temperature of 50° C., a pressure of 5 atm and a time of 15 minutes, the pressure-sensitive adhesive sheet A and adherend X, that have been tightly adhered to each other, is then left to stand at a temperature of 23° C. and a humidity of 30% for 12 hours, and then, the pressure-sensitive adhesive sheet A is separated from the adherend X, a pressure-sensitive adhesive strength of a pressure-sensitive adhesive tape B having a substrate having a thickness of 25 μm with respect to the surface of the adherend X from which the pressure-sensitive adhesive sheet A has been separated is higher than a pressure-sensitive adhesive strength of the pressure-sensitive adhesive tape B having a substrate having a thickness of 25 μm with respect to a surface of the following adherend X, wherein the pressure-sensitive adhesive strength is measured under the condition of a peel angle of 180° and a tensile speed of 300 mm/min:

Adherend X: a hardcoat film having a water contact angle of 80° or more and 100° or less.

<2> The pressure-sensitive adhesive layer according to <1>, comprising an acrylic polymer as the base polymer.

<3> The pressure-sensitive adhesive layer according to <2>, further comprising an anionic surfactant.

<4> The pressure-sensitive adhesive layer according to <3>, wherein a content of the anionic surfactant is from 0.2 to 4 parts by weight per 100 parts by weight of the base polymer.

<5> A pressure-sensitive adhesive sheet, comprising the pressure-sensitive adhesive layer according to any one of <1> to <4>.

The pressure-sensitive adhesive layer of the present invention has the above-described properties and therefore, can form a pressure-sensitive adhesive sheet capable of, in the case of separating the pressure-sensitive adhesive sheet and then providing another layer on the adherend surface to which the pressure-sensitive adhesive sheet has been laminated, putting the adherend surface into a state where wettability with the another layer and adherence between the adherend surface and the another layer are excellent.

DETAILED DESCRIPTION OF THE INVENTION (Pressure-Sensitive Adhesive Layer)

The pressure-sensitive adhesive layer of the present invention has the property of (1) below:

(1) in a case where a pressure-sensitive adhesive sheet A having the pressure-sensitive adhesive layer of the present invention is laminated to a surface of the following adherend X at a temperature of 23° C. and a humidity of 30%, the pressure-sensitive adhesive sheet A is then tightly adhered to the adherend X in an autoclave under the conditions of a temperature of 50° C., a pressure of 5 atm and a time of 15 minutes, the pressure-sensitive adhesive sheet A and adherend X, that have been tightly adhered, is then left to stand at a temperature of 23° C. and a humidity of 30% for 12 hours, and then, the pressure-sensitive adhesive sheet A is separated from the adherend X, a water contact angle A on the surface of the adherend X from which the pressure-sensitive adhesive sheet A has been separated is 70° (degree) or less (for example, from 55° to 70°):

Adherend X: a hardcoat film having a water contact angle of 80° or more and 100° or less.

In the present specification, a pressure-sensitive adhesive sheet having the pressure-sensitive adhesive layer of the present invention is sometimes referred to as "pressure-sensitive adhesive sheet A" or "pressure-sensitive adhesive sheet of the present invention". Also, in a case where the pressure-sensitive adhesive sheet A is laminated to the surface of the adherend X at a temperature of 23° C. and a humidity of 30%, the pressure-sensitive adhesive sheet A is then tightly adhered to the adherend X in an autoclave under the conditions of a temperature of 50° C., a pressure of 5 atm and a time of 15 minutes, the pressure-sensitive adhesive sheet A and adherend X, that have been tightly attached to each other, is then left to stand at a temperature of 23° C. and a humidity of 30% for 12 hours, and then, the pressure-sensitive adhesive sheet A is separated from the adherend X, the water contact angle on the surface of the adherend X from which the pressure-sensitive adhesive sheet A has been separated is sometimes referred to as "water contact angle A".

The water contact angle can be measured by the method described later in "(1) Water Contact Angle" of (Evaluation).

The water contact angle A is 70° or less (for example, from 55° to 70°) and, for example, preferably 65° or less (for example, from 55° to 65°). If the water contact angle A is 70° or less, wettability of the adherend surface with another layer in the case of providing another layer on the adherend surface after the separation of the pressure-sensitive adhesive sheet A is excellent. Therefore, the repellency (a property of repelling a pressure-sensitive adhesive, a coating material or the like and not allowing uniform adhering thereof) to another layer is reduced.

The another layer to be provided on the adherend surface after separating the pressure-sensitive adhesive sheet A is not particularly limited, and examples thereof include a layer provided by coating a liquid interlayer filler such as model number "SVR7000 Series" (produced by Dexerials Corporation) and trade name "WORLD ROCK HRJ-21" (produced by Kyoritsu Chemical & Co., Ltd.), a layer provided by coating an interlayer adhesive or the like, and a layer provided by laminating an optical transparent pressure-sensitive adhesive tape (for example, trade name "LUCIACS CS9886U" (produced by Nitto Denko Corporation)). Among others, from the standpoint that reflection is prevented and disturbing reflection is less likely occurred, a layer composed of an acrylic polymer (for example, trade name "LUCIACS CS9886U" (produced by Nitto Denko Corporation)) is preferred.

The pressure-sensitive adhesive layer of the present invention further has the property of (2) below:

(2) in a case where the pressure-sensitive adhesive sheet A is laminated to a surface of the following adherend X at a temperature of 23° C. and a humidity of 30%, the pressure-sensitive adhesive sheet A is then tightly adhered to the adherend X in an autoclave under the conditions of a temperature of 50° C., a pressure of 5 atm and a time of 15 minutes, the pressure-sensitive adhesive sheet A and adherend X, that have been tightly adhered to each other, is then left to stand at a temperature of 23° C. and a humidity of 30% for 12 hours, and then, the pressure-sensitive adhesive sheet A is separated from the adherend X, a pressure-sensitive adhesive strength (peel angle: 180°, tensile speed: 300 mm/min) of a pressure-sensitive adhesive tape B (substrate thickness: 25 μm) with respect to the surface of the adherend X from which the pressure-sensitive adhesive sheet A has been separated is higher than a pressure-sensitive adhesive strength (peel angle: 180°, tensile speed: 300 mm/min) of the pressure-sensitive adhesive tape B (substrate thickness: 25 μm) with respect to a surface of the following adherend X:

Adherend X: a hardcoat film having a water contact angle of 80 to 100°.

Here, the pressure-sensitive adhesive tape B is prepared as follows: 100 parts by weight of butyl acrylate, 5 parts by weight of acrylic acid, 0.2 parts by weight of benzoyl peroxide as a polymerization initiator, and 265 parts by weight of toluene as a solvent are added to a four-neck flask equipped with a stirring blade, a thermometer, a nitrogen gas inlet tube and a condenser, and then, a nitrogen gas is introduced thereto while gently stirring, and after that, a polymerization reaction is performed for 6 hours by keeping the liquid temperature in the flask at near 62° C. to thereby prepare an acrylic polymer solution (29 wt %). The weight average molecular weight of this acrylic polymer is 600,000, and degree of dispersion (Mw/Mn) thereof is 13.

Per 100 parts by weight of the solid content in this acrylic polymer solution, 1.5 parts by weight of melamine resin ("SUPER BECKAMINE J-820-60", trade name, produced by DIC Corporation), 3 parts by weight of a crosslinking agent ("CORONATE L", trade name, produced by Nippon Polyurethane Industry Co., Ltd) are added thereto, followed by mixing with stirring to thereby prepare an acrylic pressure-sensitive adhesive composition.

The acrylic pressure-sensitive adhesive solution obtained above is coated on a polyethylene terephthalate film having a thickness of 25 μm, followed by heat-drying to form a pressure-sensitive adhesive layer having a thickness of 28 μm, thereby forming a pressure-sensitive adhesive tape B.

The pressure-sensitive adhesive tape B thus obtained is cut into a size of 19 mm×250 mm, and the cut pressure-sensitive adhesive tape B is contact-bonded to a stainless steel by moving a 2-kg roller back and forth once at a rate of 5 mm/sec, followed by subjecting to aging for 30 minutes. When the cut pressure-sensitive adhesive tape B is peeled from the stainless steel under the condition of a peeling angle of 180° and tensile speed of 300 mm/min, the pressure-sensitive adhesive strength of the pressure-sensitive adhesive tape B is 5.5 N/19 mm.

In the present specification, the pressure-sensitive adhesive strength (peel angle: 180°, tensile speed: 300 mm/min) of a pressure-sensitive adhesive tape B (substrate thickness: 25 µm) with respect to the surface of the adherend X after having been subjected to the following treatment is sometimes referred to as "pressure-sensitive adhesive strength A": the pressure-sensitive adhesive sheet A is laminated to the surface of the adherend X at a temperature of 23° C. and a humidity of 30%, the pressure-sensitive adhesive sheet A is then tightly adhered to the adherend X in an autoclave under the conditions of a temperature of 50° C., a pressure of 5 atm and a time of 15 minutes, the pressure-sensitive adhesive sheet A and adherend X, that have been tightly adhered to each other, is then left to stand at a temperature of 23° C. and a humidity of 30% for 12 hours, and then, the pressure-sensitive adhesive sheet A is separated from the adherend X. Also, the pressure-sensitive adhesive strength (peel angle: 180°, tensile speed: 300 mm/min) of the pressure-sensitive adhesive tape B (substrate thickness: 25 µm) with respect to the surface of the adherend X (i.e. the surface of the adherend X which has not been subjected to a treatment such as laminating of a pressure-sensitive adhesive sheet) is sometimes referred to as "pressure-sensitive adhesive strength B".

Namely, the pressure-sensitive adhesive layer of the present invention has properties in which the pressure-sensitive adhesive strength A is higher than the pressure-sensitive adhesive strength B.

The adhesive strength A is not particularly limited, and for example, is preferably from 7.0 to 7.6 N/19 mm, and more preferably from 7.2 to 7.6 N/19 mm.

The difference between the pressure-sensitive adhesive strength A and the pressure-sensitive adhesive strength B is not particularly limited, and for example, is preferably 0.1 N/19 mm or more, more preferably 0.3 N/19 mm or more, and still more preferably 0.6 N/19 mm or more.

With regard to the pressure-sensitive adhesive strength A, the pressure-sensitive adhesive surface of a piece of a pressure-sensitive adhesive tape B (substrate thickness: 25 µm) having a length of 70 mm and a width of 19 mm is laminated to the adherend X surface from which the pressure-sensitive adhesive sheet of the present invention has been separated, at a temperature of 23° C. and a humidity of 30%, the piece of the pressure-sensitive adhesive tape B and the adherend X are then attached by pressing under the conditions of 0.25 MPa and 300 mm/min, the piece of the pressure-sensitive adhesive tape B and adherend X, which have been attached to each other, is then left to stand at a temperature of 23° C. and a humidity of 30% for 30 minutes, and then, a 180° peel pressure-sensitive adhesive strength (temperature: 23° C., humidity: 30% RH, peel angle: 180°, tensile speed: 300 mm/min) (N/19 mm) is measure by using a tensile tester, and this 180° peel pressure-sensitive adhesive strength is defined as the pressure-sensitive adhesive strength A. The pressure-sensitive adhesive strength B is defined as indicating the 180° peel pressure-sensitive adhesive strength measured by the same method as the pressure-sensitive adhesive strength A except for laminating the piece of the pressure-sensitive adhesive tape B to the adherend X surface (which has not been subjected to a treatment such as the lamination to the pressure-sensitive adhesive sheet). More specifically, this pressure-sensitive adhesive strength can be measured by the method described later in "(2) Pressure-Sensitive Adhesive Strength of Pressure-Sensitive Adhesive Tape B" of (Evaluation).

The water contact angle of the adherend X (the water contact angle on the hardcoat layer-side surface of the hardcoat film as the adherend X) used for the measurements of the properties (1) and (2) above is from 80 to 100°, preferably from 85 to 90°, more preferably from 86 to 88°.

The pressure-sensitive adhesive layer of the present invention contains at least a base polymer. Also, the pressure-sensitive adhesive layer of the present invention is formed of a pressure-sensitive adhesive composition. The pressure-sensitive adhesive composition is a composition used for forming the pressure-sensitive adhesive layer and is defined to encompass a composition used for forming a pressure-sensitive adhesive.

The content of the base polymer in the pressure-sensitive adhesive layer of the present invention is, although not particularly limited, preferably 70 wt % or more, more preferably 75 wt % or more, based on the total amount (100 wt %) of the pressure-sensitive adhesive layer.

Examples of the pressure-sensitive adhesive composition include, although not particularly limited, for example, a pressure-sensitive adhesive composition containing a base polymer as an essential component, and a pressure-sensitive adhesive composition containing a monomer mixture or a partial polymerization product thereof as an essential component. Examples of the pressure-sensitive adhesive composition containing the base polymer as an essential component includes a so-called solvent-type pressure-sensitive adhesive composition. Also, examples of the pressure-sensitive adhesive composition containing a monomer mixture or a partial polymerization product thereof as an essential component include a so-called active energy ray-curable pressure-sensitive adhesive composition. In the pressure-sensitive adhesive composition, various additives such as surfactant may be contained, if desired. The "monomer mixture" above means a mixture of monomer components constituting the base polymer. The "monomer mixture" is a composition composed of only monomer components, and a mixture containing only one kind of a monomer as the monomer component is also encompassed by the meaning of the monomer mixture. The "partial polymerization product" above means a composition where one component or two or more components in the monomer mixture are partially polymerized.

Examples of the base polymer include, although not particularly limited, for example, an acrylic polymer, a rubber-based polymer, a vinyl alkyl ether-based polymer, a silicone-based polymer, a polyester-based polymer, a polyamide-based polymer, a urethane-based polymer, a fluorine-based polymer, an epoxy-based polymer, and the like. One of these base polymers may be used alone, or two or more thereof may be used in combination.

The pressure-sensitive adhesive layer of the present invention preferably contains, although not particularly limited, an acrylic polymer as the base polymer, because the pressure-sensitive adhesive can be easily designed by selecting monomers as needed. That is, the pressure-sensitive adhesive composition for forming the pressure-sensitive adhesive layer of the present invention preferably contains an acrylic polymer as the base polymer. The acrylic polymer is a polymer containing an acrylic monomer (a monomer having a (meth)acryloyl group in the molecule) as a constituent monomer component.

In the present specification, the pressure-sensitive adhesive composition for forming the pressure-sensitive adhesive layer of the present invention is sometimes referred to as "the pressure-sensitive adhesive composition of the present invention".

One of acrylic polymers above may be used alone, or two or more thereof may be used in combination.

The acrylic polymer preferably contains an alkyl(meth)acrylate as a monomer component constituting the polymer.

Examples of the alkyl(meth)acrylate include, for example, an alkyl(meth)acrylate containing an alkyl group having a carbon number of 6 to 14, such as hexyl(meth)acrylate, 2-ethylhexyl(meth)acrylate, n-octyl(meth)acrylate, isooctyl(meth)acrylate, n-nonyl(meth)acrylate, isononyl(meth)acrylate, n-decyl(meth)acrylate, isodecyl(meth)acrylate, n-dodecyl(meth)acrylate, n-tridecyl(meth)acrylate and n-tetradecyl(meth)acrylate. Among these, an alkyl(meth)acrylate containing an alkyl group having a carbon number of 7 to 13 is preferred, and 2-ethylhexyl(meth)acrylate, n-octyl(meth)acrylate, isooctyl(meth)acrylate, n-nonyl(meth)acrylate, isononyl(meth)acrylate, n-decyl(meth)acrylate, isodecyl(meth)acrylate, n-dodecyl(meth)acrylate and n-tridecyl(meth)acrylate are more preferred.

One of these acrylic monomers may be used alone, or two or more thereof may be used in combination.

The ratio of the alkyl(meth)acrylate to all monomer components (100 wt %) constituting the acrylic polymer is, although not particularly limited, for example, preferably 70 wt % or more (for example, from 70 to 98 wt %), more preferably 80 wt % or more, still more preferably 85 wt % or more. If the ratio of the alkyl(meth)acrylate is 85 wt % or more, close contact of the pressure-sensitive adhesive sheet of the present invention is easily tightly adhered to the adherend.

The monomer component constituting the acrylic polymer preferably further contains a hydroxyl group-containing monomer. Examples of the hydroxyl group-containing monomer include, although not particularly limited, for example, 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, (4-hydroxymethylcyclohexyl)methyl acrylate, N-methylol(meth)acrylamide, vinyl alcohol, allyl alcohol, 2-hydroxyethyl vinyl ether, 4-hydroxybutyl vinyl ether, and diethylene glycol monovinyl ether.

One of these hydroxyl group-containing monomers may be used alone, or two or more thereof may be used in combination.

The ratio of the hydroxyl group-containing monomer to all monomer components (100 wt %) constituting the acrylic polymer is, although not particularly limited, for example, preferably from 0.1 to 15 wt %, more preferably from 0.5 to 13 wt %, still more preferably from 3 to 11 wt %, yet still more preferably from 6 to 10 wt %. If the ratio of the hydroxyl group-containing monomer is 0.1 wt % or more, thanks to the formation of a crosslinking point, a cohesive force is obtained and in turn, an adhesive residue is less likely to occur on the adherend surface after separating the pressure-sensitive adhesive sheet of the present invention, as a result, an effect of providing uniform wettability and pressure-sensitive adhesive property to the adherend surface after the separation can be obtained. If the ratio of the hydroxyl group-containing monomer is 15 wt % or less, the pressure-sensitive adhesive sheet of the present invention is prevented from coming into excessively tightly adhering to the adherend to require heavy release. In particular, if the ratio is from 6 to 10 wt %, a pressure-sensitive adhesive sheet satisfying both the releasability of the pressure-sensitive adhesive sheet and the adherence of adherend surface to another layer can be obtained.

From the standpoint that a crosslinked structure can be introduced into the acrylic polymer and the necessary cohesive force is obtained, for example, a polyfunctional monomer may be contained in the monomer components constituting the acrylic polymer.

Examples of the polyfunctional monomer include, although not particularly limited, for example, ethylene glycol di(meth)acrylate, diethylene glycol di(meth)acrylate, tetraethylene glycol di(meth)acrylate, neopentyl glycol di(meth)acrylate, 1,6-hexanediol di(meth)acrylate, trimethylolpropane tri(meth)acrylate, pentaerythritol tri(meth)acrylate, dipentaerythritol hexa(meth)acrylate, divinylbenzene, and N,N'-methylenebisacrylamide.

One of these polyfunctional monomers may be used alone, or two or more thereof may be used in combination.

The ratio of the polyfunctional monomer to all monomer components (100 wt %) constituting the acrylic polymer is, although not particularly limited, for example, preferably from 0.1 to 30 wt %, more preferably from 0.1 to 10 wt %. If the ratio of the polyfunctional monomer is 0.1 wt % or more, the flexibility and adhesiveness are excellent, and if the ratio of the polyfunctional monomer is 30 wt % or less, the cohesive force can be kept from becoming too high and appropriate pressure-sensitive adhesive strength can be obtained.

The monomer component constituting the acrylic polymer preferably further contains, although not particularly limited, an alkylene oxide group-containing reactive monomer.

The average addition molar number of the oxyalkylene unit of the alkylene oxide group-containing reactive monomer is, although not particularly limited, preferably from 3 to 40, more preferably from 4 to 35, still more preferably from 5 to 30, in view of compatibility with a surfactant in the case of using a surfactant. If the average addition molar number is 3 or more, the effect of reducing stain of a protected body due to the use of the surfactant tends to be efficiently obtained, but if the average addition molar number exceeds 40, there is a disadvantageously tendency that a significant interaction with the surfactant occurs and the effect of enhancing wettability of the adherend surface is reduced. The terminal of the oxyalkylene chain may remain a hydroxyl group or may be substituted with another functional group or the like.

As for the alkylene oxide group-containing reactive monomer, one monomer may be used alone, or two or more monomers may be mixed and used. The content of the alkylene oxide group-containing reactive monomer is, although not particularly limited, for example, preferably 10 wt % or less, more preferably 7 wt % or less, still more preferably 5 wt % or less, yet still more preferably 3 wt % or less, even yet still more preferably 1 wt % or less, based on all monomer components (100 wt %) constituting the acrylic polymer. If the content of the alkylene oxide group-containing reactive monomer exceeds 10 wt %, the cohesive force of the pressure-sensitive adhesive composition is likely to be reduced, and this is not preferred in view of staining of the adherend.

Examples of the oxyalkylene unit of the alkylene oxide group-containing reactive monomer include those containing an alkylene group having a carbon number of 1 to 6, for example, an oxymethylene group, an oxyethylene group, an oxypropylene group, and an oxybutylene group. The hydrocarbon group of the oxyalkylene chain may be linear or branched.

The alkylene oxide group-containing reactive monomer is more preferably, for example, a reactive monomer having an ethylene oxide group. By virtue of using, as the base polymer, an acrylic polymer having the reactive monomer having an ethylene oxide group as a constituent component, the compatibility between the base polymer and the surfactant is enhanced, and bleeding to the adherend is appropriately suppressed, and as a result, a low-staining pressure-sensitive adhesive composition can be obtained.

Examples of the alkylene oxide group-containing reactive monomer include, for example, a (meth)acrylic acid alkylene oxide adduct, and a reactive surfactant having, in the molecule, a reactive substituent such as acryloyl group, methacryloyl group or allyl group.

Specific examples of the (meth)acrylic acid alkylene oxide adduct include polyethylene glycol(meth)acrylate, polypropylene glycol(meth)acrylate, polyethylene glycol-polypropylene glycol(meth)acrylate, polyethylene glycol-polybutylene glycol(meth)acrylate, polypropylene glycol-polybutylene glycol(meth)acrylate, methoxypolyethylene glycol(meth)acrylate, ethoxypolyethylene glycol(meth)acrylate, butoxypolyethylene glycol(meth)acrylate, octoxypolyethylene glycol(meth)acrylate, lauroxypolyethylene glycol (meth)acrylate, stearoxypolyethylene glycol(meth)acrylate, phenoxypolyethylene glycol(meth)acrylate, methoxypolypropylene glycol(meth)acrylate, and octoxypolyethylene glycol-polypropylene glycol(meth)acrylate.

Also, specific examples of the reactive surfactant as the alkylene oxide group-containing reactive monomer include an anionic reactive surfactant, a nonionic reactive surfactant, and a cationic reactive surfactant, each containing a (meth) acryloyl group or an allyl group.

Examples of the anionic reactive surfactant include, for examples, those represented by formulae (A1) to (A10).

[Chem. 1]

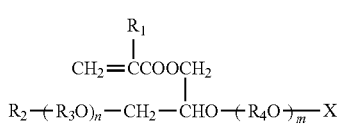

(A1)

[in the formula (A1), $R_1$ represents hydrogen or a methyl group, $R_2$ represents a hydrocarbon group having a carbon number of 1 to 30 or an acyl group having a carbon number of 1 to 30, X represents an anionic hydrophilic group, $R_3$ and $R_4$ are the same or different and each represents an alkylene group having a carbon number of 1 to 6, and each of the average addition molar numbers m and n is from 0 to 40, provided that (m+n) represents a numeral from 3 to 40].

[Chem. 2]

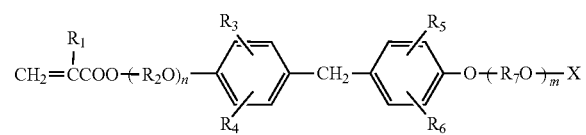

(A2)

[in the formula (A2), $R_1$ represents hydrogen or a methyl group, $R_2$ and $R_7$ are the same or different and each represents an alkylene group having a carbon number of 1 to 6, $R_3$ and $R_5$ are the same or different and each represents hydrogen or an alkyl group, $R_4$ and $R_6$ are the same or different and each represents hydrogen, an alkyl group, a benzyl group or a styrene group, X represents an anionic hydrophilic group, and each of the average molar numbers m and n is from 0 to 40, provided that (m+n) represents a numeral from 3 to 40].

[Chem. 3]

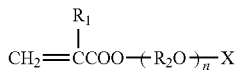

(A3)

[in the formula (A3), $R_1$ represents hydrogen or a methyl group, $R_2$ represents an alkylene group having a carbon number of 1 to 6, X represents an anionic hydrophilic group, and the average addition molar number n represents a numeral from 3 to 40].

[Chem. 4]

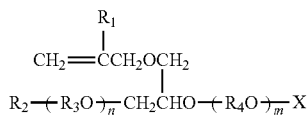

(A4)

[in the formula (A4), $R_1$ represents hydrogen or a methyl group, $R_2$ represents a hydrocarbon group having a carbon number of 1 to 30 or an acyl group having a carbon number of 1 to 30, $R_3$ and $R_4$ are the same or different and each represents an alkylene group having a carbon number of 1 to 6, X represents an anionic hydrophilic group, and each of the average addition molar numbers m and n is from 0 to 40, provided that (m+n) represents a numeral from 3 to 40].

[Chem. 5]

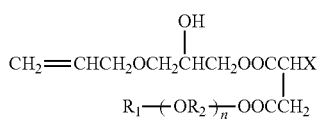

(A5)

[in the formula (A5), $R_1$ represents a hydrocarbon group, an amino group or a carboxylic acid residue, $R_2$ represents an alkylene group having a carbon number of 1 to 6, X represents an anionic hydrophilic group, and the average addition molar number n represents an integer of 3 to 40].

[Chem. 6]

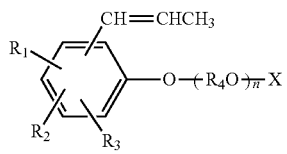

(A6)

[in the formula (A6), $R_1$ represents a hydrocarbon group having a carbon number of 1 to 30, $R_2$ represents hydrogen or a hydrocarbon group having a carbon number of 1 to 30, $R_3$ represents hydrogen or a propenyl group, $R_4$ represents an alkylene group having a carbon number of 1 to 6, X represents an anionic hydrophilic group, and the average addition molar number n represents a numeral from 3 to 40].

[Chem. 7]

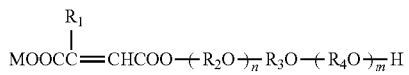

(A7)

[in the formula (A7), $R_1$ represents hydrogen or a methyl group, $R_2$ and $R_4$ are the same or different and each represents an alkylene group having a carbon number of 1 to 6, $R_3$ represents a hydrocarbon group having a carbon number of 1 to 30, M represents hydrogen, an alkali metal, an ammonium group or an alkanolammonium group, and each of the average addition molar numbers m and n is from 0 to 40, provided that (m+n) represents a numeral from 3 to 40].

[Chem. 8]

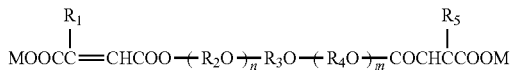
(A8)

[in the formula (A8), $R_1$ and $R_5$ are the same or different and each represents hydrogen or a methyl group, $R_2$ and $R_4$ are the same or different and each represents an alkylene group having a carbon number of 1 to 6, $R_3$ represents a hydrocarbon group having a carbon number of 1 to 30, M represents hydrogen, an alkali metal, an ammonium group or an alkanolammonium group, and each of the average addition molar numbers m and n is from 0 to 40, provided that (m+n) represents a numeral from 3 to 40].

[Chem. 9]

(A9)

[in the formula (A9), $R_1$ represents an alkylene group having a carbon number of 1 to 6, $R_2$ represents a hydrocarbon group having a carbon number of 1 to 30, M represents hydrogen, an alkali metal, an ammonium group or an alkanolammonium group, and the average addition molar number n represents a numeral from 3 to 40].

[Chem. 10]

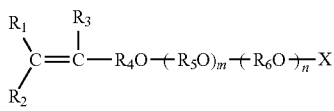
(A10)

[in the formula (A10), $R_1$, $R_2$ and $R_3$ are the same or different and each represents hydrogen or a methyl group, $R_4$ represents a hydrocarbon group having a carbon number of 0 to 30 (where a carbon number of 0 indicates that $R_4$ is not present), $R_5$ and $R_6$ are the same or different and each represents an alkylene group having a carbon number of 1 to 6, X represents an anionic hydrophilic group, and each of the average addition molar numbers m and n is from 0 to 40, provided that (m+n) represents a numeral from 3 to 40].

In the formulae (A1) to (A6) and (A10), X represents an anionic hydrophilic group. Examples of the anionic hydrophilic group include those represented by the following formulae (a1) and (a2):

[Chem. 11]

(a1)

[in the formula (a1), $M_1$ represents hydrogen, an alkali metal, ammonium group or an alkanolammonium group]; and

[Chem. 12]

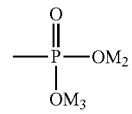
(a2)

[in the formula (a2), $M_2$ and $M_3$ are the same or different and each represents hydrogen, an alkali metal, an ammonium group or an alkanolammonium group].

Examples of the nonionic reactive surfactant include, for example, those represented by the formulae (N1) to (N6).

[Chem. 13]

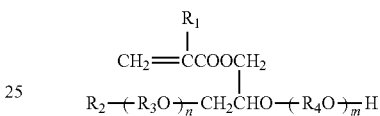
(N1)

[in the formula (N1), $R_1$ represents hydrogen or a methyl group, $R_2$ represents a hydrocarbon group having a carbon number of 1 to 30 or an acyl group having a carbon number of 1 to 30, $R_3$ and $R_4$ are the same or different and each represents an alkylene group having a carbon number of 1 to 6, and each of the average addition molar numbers m and n is from 0 to 40, provided that (m+n) represents a numeral from 3 to 40].

[Chem. 14]

$$CH_2=\overset{R_1}{\underset{|}{C}}COO-(R_2O)_n-(R_3O)_m-(R_4O)_lH$$
(N2)

[in the formula (N2), $R_1$ represents hydrogen or a methyl group, $R_2$, $R_3$ and $R_4$ are the same or different and each represents an alkylene group having a carbon number of 1 to 6, and each of the average molar numbers n, m and l is from 0 to 40 provided that (n+m+l) represents a numeral from 3 to 40].

[Chem. 15]

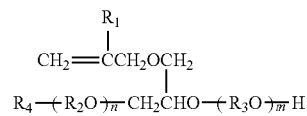
(N3)

[in the formula (N3), $R_1$ represents hydrogen or a methyl group, $R_2$ and $R_3$ are the same or different and each represents an alkylene group having a carbon number of 1 to 6, $R_4$ represents a hydrocarbon group having a carbon number of 1 to 30 or an acyl group having a carbon number of 1 to 30, and each of the average molar numbers m and n is from 0 to 40, provided that (m+n) represents a numeral from 3 to 40].

[Chem. 16]

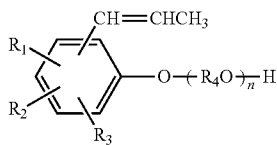

(N4)

[in the formula (N4), $R_1$ and $R_2$ are the same or different and each represents a hydrocarbon group having a carbon number of 1 to 30, $R_3$ represents hydrogen or a propenyl group, $R_4$ represents an alkylene group having a carbon number of 1 to 6, and the average molar number n represents a numeral from 3 to 40].

[Chem. 17]

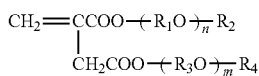

(N5)

[in the formula (N5), $R_1$ and $R_3$ are the same or different and each represents an alkylene group having a carbon number of 1 to 6, $R_2$ and $R_4$ are the same or different and each represents hydrogen, a hydrocarbon group having a carbon number of 1 to 30 or an acyl group having a carbon number of 1 to 30, and each of the average molar numbers m and n is from 0 to 40, provided that (m+n) represents a numeral from 3 to 40].

[Chem. 18]

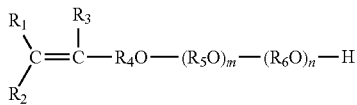

(N6)

[in the formula (N6), $R_1$, $R_2$ and $R_3$ are the same or different and each represents hydrogen or a methyl group, $R_4$ represents a hydrocarbon group having a carbon number of 0 to 30 (where a carbon number of 0 indicates that $R_4$ is not present), $R_5$ and $R_6$ are the same or different and each represents an alkylene group having a carbon number of 1 to 6, and each of the average addition molar numbers m and n is from 0 to 40, provided that (m+n) represents a numeral from 3 to 40].

As the alkylene oxide group-containing reactive monomer, for example, a commercial product such as BLEMMER PME-400, BLEMMER PME-1000, BLEMMER 50POEP-800B (all produced by NOF Corporation), LATEMUL PD-420, LATEMUL PD-430 (both are produced by Kao Corporation), ADEKA REASOAP ER-10 and ADEKA REASOAP NE-10 (all produced by Asahi Denka Co., Ltd.) may be also used.

In the monomer components constituting the acrylic polymer, monomers (other monomers) other than the above-described alkyl(meth)acrylate, hydroxyl group-containing monomer, polyfunctional monomer and alkylene oxide group-containing reactive monomer may be contained. Examples of the other monomers include, although not particularly limited, for example, a cyano group-containing monomer, a vinyl ester monomer, an aromatic vinyl monomer, an amide group-containing monomer, an imide group-containing monomer, an amino group-containing monomer, an epoxy group-containing monomer, a vinyl ether monomer, and N-acryloylmorpholine. Among these, from the standpoint of enhancing the cohesive force and heat resistance, a cyano group-containing monomer, a vinyl ester monomer and an aromatic vinyl monomer are preferred. Also, from the standpoint of enhancing the adhesive force or containing a functional group working as a crosslinking point, an amide group-containing monomer, an imide group-containing monomer, an amino group-containing monomer, an epoxy group-containing monomer, a vinyl ether monomer and N-acryloylmorpholine are preferred.

One of these other monomers may be used alone, or two or more thereof may be used in combination.

Examples of the cyano group-containing monomer include, for example, acrylonitrile and methacrylonitrile.

Examples of the vinyl ester monomer include, for example, vinyl esters such as vinyl acetate, vinyl propionate and vinyl laurate.

Examples of the aromatic vinyl monomer include, for example, styrene, chlorostyrene, chloromethylstyrene, α-methylstyrene, and other substituted styrenes.

Examples of the amide group-containing monomer include, for example, acrylamide, methacrylamide, diethylacrylamide, N-vinylpyrrolidone, N,N-dimethylacrylamide, N,N-dimethylmethacrylamide, N,N-diethylacrylamide, N,N-diethylmethacrylamide, N,N'-methylenebisacrylamide, N,N-dimethylaminopropylacrylamide, N,N-dimethylaminopropylmethacrylamide, and diacetoneacrylamide.

Examples of the imide group-containing monomer include, for example, cyclohexylmaleimide, isopropylmaleimide, N-cyclohexylmaleimide, and itaconimide.

Examples of the amino group-containing monomer include, for example, aminoethyl(meth)acrylate, N,N-dimethylaminoethyl(meth)acrylate, and N,N-dimethylaminopropyl(meth)acrylate.

Examples of the epoxy group-containing monomer include, for example, glycidyl(meth)acrylate, methyl glycidyl(meth)acrylate, and allyl glycidyl ether.

Examples of the vinyl ether monomer include, for example, methyl vinyl ether, ethyl vinyl ether, and isobutyl vinyl ether.

The ratio of the other monomers to all monomer components (100 wt %) constituting the acrylic polymer is, although not particularly limited, for example, preferably from 0 to 40 wt % (more than 0 wt % and 40 wt % or less), more preferably from 0 to 35 wt % (more than 0 wt % and 35 wt % or less), still more preferably from 0 to 30 wt % (more than 0 wt % and 30 wt % or less).

From the standpoint of suppressing a rise in the pressure-sensitive adhesive strength to the adherend, it is preferred that the monomer components constituting the acrylic polymer do not contain a carboxyl group-containing monomer, a sulfo group-containing monomer, a phosphoric acid group-containing monomer, and an acid anhydride group-containing monomer. That is, it is preferred that a carboxyl group-containing monomer, a sulfo group-containing monomer, a phosphoric acid group-containing monomer and an acid anhydride group-containing monomer are not contained in the above-described other monomers.

The acrylic polymer can be obtained by polymerizing the above-described monomer components. Examples of the polymerization method include, although not particularly limited, for example, solution polymerization, emulsion polymerization, bulk polymerization, suspension polymerization, and photopolymerization (active energy ray polymerization). Among these, in view of cost and productivity, solution polymerization is preferred. The obtained acrylic polymer may be any of a random copolymer, a block copolymer, an alternate copolymer, a graft copolymer and the like.

Examples of the solution polymerization method include, although not particularly limited, for example, a method of dissolving the above-described monomer components, a polymerization initiator and the like in a solvent and heating the solution to effect polymerization, thereby obtaining an acrylic polymer solution containing an acrylic polymer.

As the solvent used for the solution polymerization method, various general solvents can be used. Examples of this solvent (polymerization solvent) include an organic solvent such as: aromatic hydrocarbons such as toluene, benzene and xylene; esters such as ethyl acetate and n-butyl acetate; aliphatic hydrocarbons such as n-hexane and n-heptane; alicyclic hydrocarbons such as cyclohexane and methylcyclohexane; and ketones such as methyl ethyl ketone and methyl isobutyl ketone.

One of these solvents may be used alone, or two or more thereof may be used in combination.

The blending ratio of the solvent is, although not particularly limited, for example, preferably from 10 to 1,000 parts by weight, more preferably from 50 to 500 parts by weight, based on the total amount (100 parts by weight) of monomer components constituting the acrylic polymer.

Examples of the polymerization initiator for use in the solution polymerization method include, although not particularly limited, for example, a peroxide-based polymerization initiator and an azo-based polymerization initiator. Examples of the peroxide-based polymerization initiator include, although not particularly limited, for example, peroxycarbonate, ketone peroxide, peroxyketal, hydroperoxide, dialkyl peroxide, diacyl peroxide, and peroxyester, and more specific examples thereof include benzoyl peroxide, tert-butyl hydroperoxide, di-tert-butyl peroxide, tert-butyl peroxybenzoate, dicumyl peroxide, 1,1-bis(tert-butylperoxy)-3,3,5-trimethylcyclohexane, 1,1-bis(tert-butylperoxy)cyclododecane, and the like. Examples of the azo-based polymerization initiator include, although not particularly limited, for example, 2,2'-azobisisobutyronitrile, 2,2'-azobis-2-methylbutyronitrile, 2,2'-azobis(2,4-dimethylvaleronitrile), dimethyl 2,2'-azobis(2-methylpropionate), 2,2'-azobis(4-methoxy-2,4-dimethylvaleronitrile), 1,1'-azobis(cyclohexane-1-carbonitrile), 2,2'-azobis(2,4,4-trimethylpentane), 4,4'-azobis-4-cyanovaleric acid, 2,2'-azobis(2-amidinopropane)dihydrochloride, 2,2'-azobis[2-(5-methyl-2-imidazolin-2-yl)propane]dihydrochloride, 2,2'-azobis(2-methylpropionamidine)disulfate, 2,2'-azobis(N,N'-dimethyleneisobutylamidine)hydrochloride, and 2,2'-azobis[N-(2-carboxyethyl)-2-methylpropionamidine]hydrate.

One of these polymerization initiators may be used alone, or two or more thereof may be used in combination.

The blending amount of the polymerization initiator is, although not particularly limited, for example, preferably from 0.01 to 5 parts by weight, more preferably from 0.05 to 3 parts by weight, based on the total amount (100 parts by weight) of monomer components constituting the acrylic polymer.

In the solution polymerization method, although not particularly limited, the heating temperature during heating the solution to effect polymerization is, for example, from 50 to 80° C. The heating time is, although not particularly limited, for example, from 1 to 24 hours.

In the case where the pressure-sensitive adhesive composition for forming the pressure-sensitive adhesive layer of the present invention contains the above-described acrylic polymer, the acrylic polymer is the base polymer which is a main component of the pressure-sensitive adhesive. The content of the acrylic polymer in the pressure-sensitive adhesive composition for forming the pressure-sensitive adhesive layer of the present invention is, although not particularly limited, for example, preferably 70 wt % or more, more preferably 80 wt % or more, still more preferably 90 wt % or more, based on the total amount (100 wt %) of the pressure-sensitive adhesive composition of the present invention. If the content of the acrylic polymer in the pressure-sensitive adhesive composition for forming the pressure-sensitive adhesive layer of the present invention is 70 wt % or more, in the case of providing another layer on the adherend surface after separating the pressure-sensitive adhesive sheet of the present invention, the pressure-sensitive adhesive strength between the adherend surface and the another layer is more increased.

The weight average molecular weight of the acrylic polymer is, although not particularly limited, for example, preferably from 100,000 to 5,000,000, more preferably from 200,000 to 4,000,000, still more preferably from 300,000 to 3,000,000. If the weight average molecular weight is less than 100,000, the cohesive force is reduced to cause an adhesive residue on the adherend surface after separating the pressure-sensitive adhesive sheet of the present invention, and the effect of providing uniform wettability and pressure-sensitive adhesive property to the adherend surface after the separation may not be obtained. If the weight average molecular weight exceeds 5,000,000, wettability of the adherend surface after separating the pressure-sensitive adhesive sheet of the present invention may be insufficient.

The weight average molecular weight indicates the value obtained by measuring the polymer by gel permeation chromatography (GPC). More specifically, for example, the measurement is performed under the following conditions by using "HLC-8220GPC" (trade name, manufactured by Tosoh Corporation) as the GPC apparatus, and then, the weight-average molecular weight can be calculated as the value in terms of standard polystyrene.

(Measurement Conditions of Molecular Weight)

Sample concentration: 0.2 wt % (tetrahydrofuran solution)
Sample injection amount: 10 μl
Sample column: TSKguardcolumn SuperHZ-H (1 column)+TSKgel Super HZM-H (2 columns)
Reference column; TSKgel SuperH-RC (1 column)
Eluent: tetrahydrofuran (THF)
Flow rate: 0.6 mL/min
Detector: Differential refractometer (RI)
Column temperature (measurement temperature): 40° C.

The glass transition temperature (Tg) of the acrylic polymer is, although not particularly limited, for example, preferably 0° C. or less, more preferably −10° C. or less. If the glass transition temperature exceeds 0° C., wettability of the adherend surface after separating the pressure-sensitive adhesive sheet of the present invention may become insufficient. The glass transition temperature of the acrylic polymer can be adjusted by changing the compositional ratio of monomer components constituting the acrylic polymer.

The glass transition temperature (° C.) can be determined as the glass transition temperature Tgn (° C.) of a homopolymer of each monomer according to the following formula:

$$1/(Tg+273) = \Sigma[Wn/(Tgn+273)]$$

[wherein Tg (° C.) represents the glass transition temperature of the copolymer, Wn (−) represents the weight fraction of each monomer, Tgn (° C.) represents the glass transition temperature of a homopolymer of each monomer, and n represents the kind of each monomer].

The acid value of the acrylic polymer is, although not particularly limited, for example, preferably 15 or less. The acid value can be measured using an automatic titration apparatus (COM-550, manufactured by Hiranuma Sangyo Co., Ltd.) and calculated according to the following formula:

$$A=\{(Y-X) \times f \times 5.611\}/M$$

A: an acid value
Y: a titration amount (ml) of a sample solution
X: a titration amount (ml) of a solution containing only 50 g of a mixed solvent
f: a factor of a titration solution
M: weight (g) of the polymer sample
The measurement conditions are as follows.
Sample solution: A solution obtained by dissolving about 0.5 g of the polymer sample in 50 g of a mixed solvent (toluene/2-propanol/distilled water=50/49.5/0.5 by weight) is used as the sample solution.
Titration solution: A 0.1 N 2-propanolic potassium hydroxide solution (produced by Wako Pure Chemical Industries, Ltd.; for a petroleum product neutralization value test).
Electrode:
Glass electrode: GE-101
Comparison electrode: RE-201
Measurement Mode: Petroleum Product Neutralization Value Test 1.

From the standpoint that wettability of the adherend surface after separating the pressure-sensitive adhesive sheet of the present invention is more enhanced, the pressure-sensitive adhesive layer of the present invention preferably further contains a surfactant. That is, the pressure-sensitive adhesive composition for forming the pressure-sensitive adhesive of the present invention preferably further contains a surfactant.

Examples of the surfactant include, although not particularly limited, for example, a nonionic surfactant such as polyoxyalkylene fatty acid esters, polyoxyalkylene sorbitan fatty acid esters, polyoxyalkylene sorbitol fatty acid esters, polyoxyalkylene alkyl ethers, polyoxyalkylene alkylallyl ethers, polyoxyalkylene alkylphenyl ethers, polyoxyalkylene derivatives, polyoxyalkylene alkylamines, and polyoxyalkylene alkylamine fatty acid esters; an anionic surfactant such as sulfate (e.g., sodium alkylbenzenesulfonate), alkyl sulfate (e.g., sodium laurylsulfate), dialkylarylsulfonate, sulfosuccinate (e.g., alkali metal dialkylsulfosuccinate), higher fatty acid alkali metal salt, polyoxyalkylene alkyl ether sulfate salts, polyoxyalkylene alkyl ether phosphate salts, polyoxyalkylene alkylphenyl ether sulfate salts and polyoxyalkylene alkylphenyl ether phosphate salts; and a cationic surfactant and an amphoteric surfactant, each having an alkylene oxide group. In addition, the surfactant may have, in the molecule, a reactive substituent such as (meth)acryloyl group and allyl group.

One of these surfactants may be used alone, or two or more thereof may be used in combination.

Among others, an anionic surfactant is preferred, because the surfactant readily transfers to the adherend surface after laminating the pressure-sensitive adhesive sheet of the present invention to an adherend and the pressure-sensitive adhesive strength between the adherend surface and another layer is more enhanced in the case of separating the pressure-sensitive adhesive sheet of the present invention and then providing another layer on the adherend surface. Above all, examples of the anionic surfactant producing a particularly excellent effect include polyoxyalkylene alkylphenyl ether sulfate salts (in particular, ammonium polyoxyethylene nonylpropenylphenyl ether sulfate) and alkali metal dialkylsulfosuccinates (in particular, sodium dioctylsulfosuccinate).

In addition, examples of the surfactant producing a particularly excellent effect include compounds represented by the following formulae (1) and (2):

[Chem. 19]

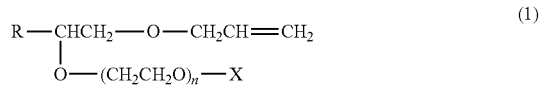

[in the formula (1), R represents a hydrocarbon group having a carbon number of 1 to 12 (in particular, a hydrocarbon group having a carbon number of 10 or a hydrocarbon group having a carbon number of 12), X represents an anionic hydrophilic group, and the average addition molar number n represents a numeral from 3 to 40]; and

[Chem. 20]

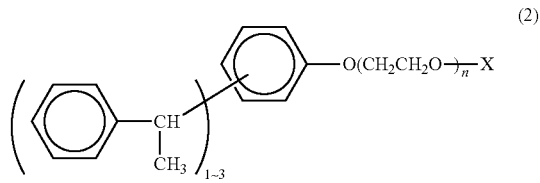

[in the formula (2), X represents an anionic hydrophilic group].

Examples of the anionic hydrophilic group in the compound represented by formula (1) and the compound represented by formula (2) include those represented by the above formulae (a1) and (a2).

Examples of the compound represented by the formula (1) include, for example, ammonium polyoxyethylene-1-(allyloxymethyl)alkyl ether sulfate, and examples of the compound represented by the formula (2) include, for example, ammonium polyoxyethylene styrenated phenyl ether sulfate.

As the anionic surfactant, a general commercial product can be used, and examples thereof include those under the trade name "AQUARON HS-10" (produced by Dai-ichi Kogyo Seiyaku Co., Ltd.), the trade name "NEOCOL P" (produced by Dai-ichi Kogyo Seiyaku Co., Ltd.), and the trade name "HITENOL N-08" (produced by Dai-ichi Kogyo Seiyaku Co., Ltd.). Other examples thereof include those under the trade name "HITENOL NF-13" (produced by Dai-ichi Kogyo Seiyaku Co., Ltd.), the trade name "HITENOL NF-17" (produced by Dai-ichi Kogyo Seiyaku Co., Ltd.), and the trade name "AQUARON KH-10" (produced by Dai-ichi Kogyo Seiyaku Co., Ltd.).

The blending amount of the surfactant is, although not particularly limited, for example, preferably from 0.1 to 4 wt %, more preferably from 0.15 to 3 wt %, based on the total weight (100 wt %) of the pressure-sensitive adhesive composition for forming the pressure-sensitive adhesive layer of the present invention.

In the case where the pressure-sensitive adhesive composition for forming the pressure-sensitive adhesive layer of the present invention contains the acrylic polymer, although not particularly limited, the blending amount of the surfactant is, for example, preferably from 0.2 to 4 parts by weight, more preferably from 0.2 to 3 parts by weight, still more preferably from 0.3 to 3 parts by weight, per 100 parts by weight of the acrylic polymer. If the blending amount of the surfactant is 0.2 parts by weight or more per 100 parts by weight of the acrylic polymer, wettability of the adherend surface after separating the pressure-sensitive adhesive sheet of the present invention is more enhanced. Also, if the blending amount is 4 parts by weight or less, in the case of providing another layer on the adherend surface from which the pressure-sensitive adhesive sheet of the present invention has been separated, the pressure-sensitive adhesive strength between the adherend surface and another layer is more increased.

From the standpoint that an appropriate cohesive force is obtained, the pressure-sensitive adhesive layer of the present invention may further contain a crosslinking agent. That is, the pressure-sensitive adhesive composition for forming the pressure-sensitive adhesive layer of the present invention may further contain a crosslinking agent. As the crosslinking agent, although not particularly limited, for example, an isocyanate-based crosslinking agent, an epoxy-based crosslinking agent, a melamine-based crosslinking agent, an azilidine-based crosslinking agent, or a metal chelate-based crosslinking agent may be used. Among these, an isocyanate-based crosslinking agent and an epoxy-based crosslinking agent are preferred.

One of these crosslinking agents is used alone, or two or more thereof are used in combination.

Examples of the isocyanate-based crosslinking agent include, for example, lower aliphatic polyisocyanates such as butylene diisocyanate and hexamethylene diisocyanate, alicyclic isocyanates such as cyclopentylene diisocyanate, cyclohexylene diisocyanate and isophorone diisocyanate, aromatic isocyanates such as 2,4-tolylene diisocyanate, 4,4'-diphenylmethane diisocyanate and xylylene diisocyanate, and isocyanate adducts such as trimethylolpropane/tolylene diisocyanate trimer adduct ("CORONATE L", trade name, produced by Nippon Polyurethane Industry Co., Ltd.), trimethylolpropane/hexamethylene diisocyanate trimer adduct ("CORONATE HL", trade name, produced by Nippon Polyurethane Industry Co., Ltd.) and isocyanurate form of hexamethylene diisocyanate ("CORONATE HX", trade name, produced by Nippon Polyurethane Industry Co., Ltd.).

Examples of the epoxy-based crosslinking agent include, for example, bisphenol A, an epichlorohydrin epoxy-based resin, ethylene glycidyl ether, polyethylene glycol diglycidyl ether, glycerin diglycidyl ether, glycerin triglycidyl ether, 1,6-hexanediol glycidyl ether, trimethylolpropane triglycidyl ether, diglycidyl aniline, diamine glycidyl amine, N,N,N',N'-tetraglycidyl-m-xylylenediamine ("TETRAD-X", trade name, produced by Mitsubishi Gas Chemical Company, Inc.), and 1,3-bis(N,N-diglycidyl aminomethyl)cyclohexane ("TETRAD-C", trade name, produced by Mitsubishi Gas Chemical Company, Inc.).

The blending amount of the crosslinking agent is, although not particularly limited, for example, preferably from 0.01 to 15 wt %, more preferably from 0.5 to 10 wt %, based on the total weight (100 wt %) of the pressure-sensitive adhesive composition for forming the pressure-sensitive adhesive layer of the present invention.

In the case where the pressure-sensitive adhesive composition for forming the pressure-sensitive adhesive layer of the present invention contains the acrylic polymer, although not particularly limited, the blending amount of the crosslinking agent is, for example, preferably from 0.01 to 15 parts by weight, more preferably from 0.5 to 10 parts by weight, still more preferably from 2 to 9 parts by weight, yet still more preferably from 6 to 8 parts by weight, per 100 parts by weight of the acrylic polymer. If the blending amount of the crosslinking agent is 0.01 parts by weight or more per 100 parts by weight of the acrylic polymer, a cohesive force is obtained and in turn, an effect of less causing an adhesive residue on the adherend surface after separating the pressure-sensitive adhesive sheet of the present invention, and imparting uniform wettability and pressure-sensitive adhesive property to the adherend surface after the separation can be obtained. If the blending amount is 15 parts by weight or less, wettability of the adherend surface after separating the pressure-sensitive adhesive sheet of the present invention is more enhanced. In particular, if the blending amount is from 6 to 8 parts by weight, an effect of satisfying both uniform wettability of the adherend surface after the separation and pressure-sensitive adhesive property allowing for light release can be obtained.

The pressure-sensitive adhesive layer of the present invention may further contain a crosslinking catalyst. That is, the pressure-sensitive adhesive composition for forming the pressure-sensitive adhesive layer of the present invention may further contain a crosslinking catalyst. Examples of the crosslinking catalyst include, although not particularly limited, for example, a metal-based crosslinking catalyst (in particular, a tin-based crosslinking catalyst) such as tetra-n-butyl titanate, tetraisopropyl titanate, Nacem ferric iron, butyltin oxide and dioctyltin dilaurate.

One of these crosslinking catalyst is used alone, or two or more thereof are used in combination.

The blending amount of the crosslinking catalyst is, although not particularly limited, for example, preferably from 0.004 to 0.05 wt %, more preferably from 0.004 to 0.03 wt %, based on the total weight (100 wt %) of the pressure-sensitive adhesive composition for forming the pressure-sensitive adhesive layer of the present invention.

In the case where the pressure-sensitive adhesive composition of the present invention contains the acrylic polymer, although not particularly limited, the blending amount of the crosslinking catalyst is, for example, preferably from 0.001 to 0.05 parts by weight, more preferably from 0.003 to 0.04 parts by weight, still more preferably from 0.005 to 0.03 parts by weight, per 100 parts by weight of the acrylic polymer. If the blending amount of the crosslinking catalyst per 100 parts by weight of the acrylic polymer is within the range above, the crosslinking swiftly proceeds, so that the productivity can be enhanced.

The pressure-sensitive adhesive layer of the present invention may further contain a crosslinking retardant. That is, the pressure-sensitive adhesive composition for forming the pressure-sensitive adhesive layer of the present invention may further contain a crosslinking retardant. Examples of the crosslinking retardant include, although not particularly limited, for example, a β-ketoester such as methyl acetoacetate, ethyl acetoacetate, octyl acetoacetate, oleyl acetoacetate, lauryl acetoacetate and stearyl acetoacetate, and a β-diketone such as acetylacetone, 2,4-hexanedione and benzoylacetone. Among these, acetylacetone is preferred.

One of these crosslinking retardants is used alone, or two or more thereof are used in combination.

The blending amount of the crosslinking retardant is, although not particularly limited, for example, preferably from 0.1 to 10 wt %, more preferably from 0.1 to 3 wt %, based on the total weight (100 wt %) of the pressure-sensitive adhesive composition for forming the pressure-sensitive adhesive layer of the present invention.

In the case where the pressure-sensitive adhesive composition of the present invention contains the acrylic polymer, although not particularly limited, the blending amount of the crosslinking retardant is, for example, preferably from 0.1 to 10 parts by weight, more preferably from 0.1 to 5 parts by weight, still more preferably from 0.1 to 3 parts by weight, per 100 parts by weight of the acrylic polymer. If the blending amount of the crosslinking retardant per 100 parts by weight of the acrylic polymer is within the range above, the usable life of the pressure-sensitive adhesive can be prolonged.

The pressure-sensitive adhesive composition for forming the pressure-sensitive adhesive layer of the present invention may further contain a solvent. That is, the pressure-sensitive adhesive composition for forming the pressure-sensitive adhesive layer of the present invention may be a solvent-type pressure-sensitive adhesive composition. Examples of the solvent in the pressure-sensitive adhesive composition for forming the pressure-sensitive adhesive layer of the present invention include, for example, solvents for use in the above-described solution polymerization method. The solvent in the pressure-sensitive adhesive composition for forming the pressure-sensitive adhesive layer of the present invention may be the same as or different from the solvent used in the solution polymerization method.

As for the solvent in the pressure-sensitive adhesive composition for forming the pressure-sensitive adhesive layer of the present invention, one solvent may be used alone, or two or more solvents may be used in combination.

The pressure-sensitive adhesive composition for forming the pressure-sensitive adhesive layer of the present invention may contain additives such as plasticizer, an anti-aging agent, a colorant (such as pigment and dye), an antistatic agent and a tackifier resin, as long as the effects of the present invention are not impaired.

The pressure-sensitive adhesive composition for forming the pressure-sensitive adhesive layer of the present invention may be prepared, although not particularly limited, for example, by mixing the above-described acrylic polymer, crosslinking agent, crosslinking catalyst, crosslinking retardant, other additives, and the like, which are added as needed.

(Pressure-Sensitive Adhesive Sheet)

The pressure-sensitive adhesive sheet (pressure-sensitive adhesive sheet A) of the present invention has at least one pressure-sensitive adhesive layer of the present invention. The pressure-sensitive adhesive sheet of the present invention may have a substrate, a pressure-sensitive adhesive layer other than the pressure-sensitive adhesive layer of the present invention (sometimes referred to "other pressure-sensitive adhesive layer"), and the like, in addition to the pressure-sensitive adhesive layer of the present invention. Also, the pressure-sensitive adhesive sheet may have an interlayer, an undercoat layer and the like, as long as the effects of the present invention are not impaired. As for the layers provided in addition to the pressure-sensitive adhesive layer of the present invention, only one layer may be provided or two or more layers may be provided, for each layer. The pressure-sensitive adhesive sheet of the present invention may be, for example, in a form of being wounded into a roll or in a form where sheets are stacked.

The "pressure-sensitive adhesive sheet" is intended to encompass the "pressure-sensitive adhesive tape". That is, the pressure-sensitive adhesive sheet of the present invention may be a pressure-sensitive adhesive tape having a tape-shaped form.

The pressure-sensitive adhesive sheet of the present invention may be a single-sided pressure-sensitive adhesive sheet where a pressure-sensitive adhesive layer surface (pressure-sensitive adhesive surface) (namely, the surface of the pressure-sensitive adhesive layer of the present invention) is included on only one side of the sheet, or a double-sided pressure-sensitive adhesive sheet where a pressure-sensitive adhesive layer surface is included on both sides of the sheet.

The pressure-sensitive adhesive sheet of the present invention may be a pressure-sensitive adhesive sheet not having a substrate (a substrate layer, a support or a supporting film), namely, a so-called "substrate-less type" pressure-sensitive adhesive sheet (sometimes referred to as "a substrate-less pressure-sensitive adhesive sheet"), or a pressure-sensitive adhesive sheet having a substrate. Examples of the substrate-less pressure-sensitive adhesive sheet include, for example, a double-sided pressure-sensitive adhesive sheet composed of only the pressure-sensitive adhesive layer of the present invention, and a double-sided pressure-sensitive adhesive sheet including the pressure-sensitive adhesive layer of the present invention and the other pressure-sensitive adhesive layer(s). Examples of the pressure-sensitive adhesive sheet having a substrate include, for example, a single-sided pressure-sensitive adhesive sheet having the pressure-sensitive adhesive layer of the present invention on one side of a substrate, a double-sided pressure-sensitive adhesive sheet having the pressure-sensitive adhesive layer of the present invention on both sides of a substrate, and a double-sided pressure-sensitive adhesive sheet having the pressure-sensitive adhesive layer of the present invention on one side of a substrate and having the other pressure-sensitive adhesive layer on the other side thereof. The double-sided pressure-sensitive adhesive sheet composed of only the pressure-sensitive adhesive layer of the present invention indicates the pressure-sensitive adhesive layer itself of the present invention.

Among others, in view of an excellent property of protecting the adherend surface, a pressure-sensitive adhesive sheet having a substrate is preferred, and a single-sided pressure-sensitive adhesive sheet having the pressure-sensitive adhesive layer of the present invention on one side of a substrate is more preferred.

The "substrate" above is a portion to be attached to an adherend together with the pressure-sensitive adhesive layer in the case of applying (attaching) the pressure-sensitive adhesive sheet of the present invention to the adherend, and a separator (release liner) to be separated in the case of using (attaching) the pressure-sensitive adhesive sheet is not encompassed in the meaning of the substrate.

Examples of the substrate include, although not particularly limited, for example, a paper-based substrate such as paper; a fiber-based substrate such as cloth, nonwoven fabric and net; a metal-based substrate such as metal foil and metal sheet; a plastic substrate such as film or sheet formed of various resins (for example, a polyolefin-based resin such as polyethylene, polypropylene, poly-1-butene, poly-4-methyl-1-pentene, ethylene.propylene copolymer, ethylene.1-butene copolymer, ethylene.vinyl acetate copolymer, ethylene.ethyl acrylate copolymer and ethylene.vinyl alcohol copolymer, a polyester-based resin such as polyethylene terephthalate, polyethylene naphthalate and polybutylene terephthalate, an acrylic resin such as polymethyl methacrylate, a polyamide-based resin such as nylon 6, nylon 6,6 and partially aromatic polyamide, a polystyrene-based resin, a polyvinyl chloride-based resin, a polyvinylidene-based resin, a polycarbonate resin, a vinyl acetate-based resin, a polyimide-based resin, polyether ether ketone (PEEK), polyphenylene sulfide (PPS), triacetyl cellulose, or a combination of these resins); a rubber-based substrate such as rubber sheet; a foam-based substrate such as foam sheet; and a laminate thereof (for example, a laminate of a plastic substrate and another substrate). The substrate may be a substrate formed of a material obtained by combining the materials recited for the substrate above. The substrate may have a single-layer configuration or may have a multilayer configuration.

The thickness of the substrate is, although not particularly limited, for example, preferably from 20 to 200 μm, more preferably from 20 to 100 μm. Also, the substrate may be subjected to, if desired, various treatments such as back side treatment, antistatic treatment and primer treatment.

The thickness of the pressure-sensitive adhesive layer of the present invention is, although not particularly limited, for example, preferably from 5 to 100 μm, more preferably from 5 to 20 μm. If the thickness of the pressure-sensitive adhesive layer of the present invention is 5 μm or more, wettability of the adherend surface after separating the pressure-sensitive adhesive sheet of the present invention is more enhanced.

The content of he acrylic polymer in the pressure-sensitive adhesive layer of the present invention is, although not particularly limited, for example, preferably 75 wt % or more, more preferably 85 wt % or more, still more preferably 90 wt % or more, per 100 wt % of the pressure-sensitive adhesive layer of the present invention. If the content of the acrylic polymer in the pressure-sensitive adhesive layer of the present invention is 90 wt % or more, in the case of providing another layer on the adherend surface after separating the pressure-sensitive adhesive sheet of the present invention, the pressure-sensitive adhesive strength between the adherend surface and the another layer is more increased.

Examples of the other pressure-sensitive adhesive layer include, although not particularly limited, for example, a conventional pressure-sensitive adhesive layer formed of a conventional pressure-sensitive adhesive such as urethane-based pressure-sensitive adhesive, acrylic pressure-sensitive adhesive, rubber-based pressure-sensitive adhesive, silicone-based pressure-sensitive adhesive, polyester-based pressure-sensitive adhesive, polyamide-based pressure-sensitive adhesive, epoxy-based pressure-sensitive adhesive, vinyl alkyl ether-based pressure-sensitive adhesive, and fluorine-based pressure-sensitive adhesive.

As for the pressure-sensitive adhesive to form the other pressure-sensitive adhesive layer, one pressure-sensitive adhesive may be used alone, or two or more pressure-sensitive adhesives may be used in combination.

The surface of the pressure-sensitive adhesive layer (for example, the pressure-sensitive adhesive layer of the present invention) in the pressure-sensitive adhesive sheet of the present invention may be protected by a release liner (separator). In the case where the pressure-sensitive adhesive sheet of the present invention is a double-sided pressure-sensitive adhesive sheet, only the surface on one side may be protected by a release liner, or the surfaces on both sides may be protected by a release liner.

Examples of the release liner include, although not particularly limited, for example, a release liner where the surface of a substrate (liner substrate) such as paper and plastic film is silicone-treated, and a release liner where a polyolefin-based resin is laminated onto the surface of a substrate (liner substrate) such as paper and plastic. Examples of the plastic film in the liner substrate include, although not particularly limited, for example, a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film. The polyolefin-based resin laminated onto the surface of the liner substrate is, although not particularly limited, preferably a polyethylene-based resin.

The thickness of the release liner is, although not particularly limited, for example, preferably from 10 to 100 μm, more preferably from 15 to 30 μm.

As for the production method of the pressure-sensitive adhesive sheet of the present invention, a conventional production method may be used, and examples of the production method include, although not particularly limited, for example, a method where the pressure-sensitive adhesive composition (solution) prepared by dissolving the above-described acrylic polymer, surfactant, crosslinking agent, crosslinking catalyst, crosslinking retardant and the like in the above-described solvent is coated (applied) onto a substrate or a separator and then dried and/or cured.

In the case of coating the pressure-sensitive adhesive composition of the present invention, a conventional coater (for example, a gravure roll coater, a reverse roll coater, a kiss roll coater, a dip roll coater, a bar coater, a knife coater, and a spray coater) can be used.

The thickness of the pressure-sensitive adhesive sheet of the present invention is, although not particularly limited, for example, preferably from 25 to 220 μm, more preferably from 25 to 120 μm.

The pressure-sensitive adhesive sheet of the present invention is a pressure-sensitive adhesive sheet capable of adjusting the water contact angle A on the adherend X surface to 70° or less (for example, from 50° to 70°), wherein the adherend X has been subjected to the lamination of the pressure-sensitive adhesive sheet of the present invention thereto and the separation of the pressure-sensitive adhesive layer.

Other than the adherend X, even when laminated to, for example, an adherend such as acrylic plate, the pressure-sensitive adhesive sheet of the present invention can reduce the water contact angle on the adherend surface after separating the pressure-sensitive adhesive sheet of the present invention, and in the case of providing another layer on the adherend surface from which the pressure-sensitive adhesive sheet has been separated, can put the adherend surface into a state excellent in the wettability of the adherend surface with another layer.

The pressure-sensitive adhesive sheet of the present invention is a pressure-sensitive adhesive sheet capable of making the pressure-sensitive adhesive strength A higher than the pressure-sensitive adhesive strength B.

Generally, in many cases, a part of the pressure-sensitive adhesive layer of a pressure-sensitive adhesive sheet remains on an adherend when peeling off the pressure-sensitive adhesive sheet laminated to the adherend, and in the case of providing another layer on the adherend surface, due to the contamination of the adherend surface, the adherence (pressure-sensitive adhesive property) between the adherend surface and another layer is reduced. However, according to the pressure-sensitive adhesive sheet of the present invention, the adherence of the adherend surface after separating the pressure-sensitive adhesive sheet of the present invention is enhanced.

If the pressure-sensitive adhesive composition of the present invention contains a surfactant, the surfactant transfers to the adherend surface, whereby the water contact angle after separating the pressure-sensitive adhesive sheet of the present invention is likely to decrease and the wettability with another layer becomes more excellent. Also, the repellency to another layer is reduced. In particular, an anionic surfactant readily transfers to the adherend surface and therefore, produces a great effect of enhancing the wettability with another layer. Among others, if the pressure-sensitive adhesive layer of the present invention contains an acrylic polymer and an anionic surfactant, the anionic surfactant and the acrylic polymer transfer to the adherend surface, and maybe because the anionic surfactant and the acrylic polymer interact with each other to enhance the adherence to another layer, wettability of the adherend surface with another layer is more improved, and the adherence between the adherend surface and another layer becomes more excellent. Above all, unlike the case of causing peel-off of a part of the pressure-sensitive adhesive, this effect is uniformly obtained throughout the adherend surface.

The pressure-sensitive adhesive sheet of the present invention is used, although not particularly limited, for example, in applications where after pressure-sensitive adhesive sheet of the present invention is laminated to protect the surface of a member having optical properties (for example, polarization, light refraction, light scattering, light reflection, light transmittance, light absorption, light diffraction, optical rotation and visibility) and then separated, and in the case of providing another layer on the adherend surface from which the pressure-sensitive adhesive sheet has been separated, the adherend surface is put into a state exhibiting excellent wettability of the adherend surface with the another layer and excellent adherence between the adherend surface and the another layer. That is, the pressure-sensitive adhesive sheet of the present invention is preferably a pressure-sensitive adhesive sheet for surface protection of a member having optical properties, more preferably a pressure-sensitive adhesive sheet for protecting the surface of a member having optical properties, enhancing the wettability and increasing the adherence.

Examples of the member having optical properties include, although not particularly limited, for example, a member constituting an optical product such as display device (image display device) and input device, and a member used for these devices (optical products), and specific examples thereof include a polarizing plate, a wave plate, a retardation plate, an optical compensation film, a brightness enhancing film, a light guide plate, a reflective film, an anti-reflection film, a transparent conductive film (e.g. ITO film), a design film, a decoration film, a surface protective film, a prism, a lens, a color filter, a transparent substrate, and a member in which such a member is laminated. Among these, a polarizing plate is preferred, and the above-described adherend X is particularly preferred.

Examples of the method for providing another layer on the adherend after separating the pressure-sensitive adhesive sheet of the present invention include, although not particularly limited, for example, a method including a step of laminating the pressure-sensitive adhesive sheet of the present invention to an adherend (laminating step), a step of separating the pressure-sensitive adhesive sheet of the present invention from the adherend (separating step), and a step of providing another layer on the adherend surface (another layer-providing step).

Examples of the adherend in the laminating step include, for example, the above-described member having optical properties. Among others, the adherend X is preferred. Examples of the temperature and pressure in the case of laminating the pressure-sensitive adhesive sheet of the present invention to an adherend include, for example, a temperature of 0 to 50° C. and a pressure of 1 to 10 atm.

After the laminating step, a step of allowing the adherend to stand at a temperature of 0 to 50° C. for 1 to 120 hours (standing step) may be included. Thanks to the standing step, the component for enhancing the adherence is more likely to transfer to the adherend surface from the pressure-sensitive adhesive sheet of the present invention.

In the separating step, examples of the separating conditions include, for example, a pulling speed of 300 to 100,000 mm/min, a separation angle (pulling angle) of 90 to 180°. The temperature in the separating step may be the same as or different from that in the laminating step or standing step. Examples of the temperature in the separating step include, for example, a temperature of 0 to 50° C.

The another layer-providing step may be provided successively after the separating step or may be provided after an interval (for example, from 1 to 24 hours).

Example of the another layer in the another layer-providing step include, for example, those recited above. Among others, a layer provided by coating the above-described interlayer filler is preferred.

According to the method of providing another layer on the adherend from which the pressure-sensitive adhesive sheet of the present invention has been separated, the adherence between the adherend and another layer is excellent.

EXAMPLES

The present invention is described in greater detail below by referring to Examples and Comparative Examples, but the present invention is not limited thereto.

Example 1

200 parts by weight of 2-ethylhexyl acrylate, 8 parts by weight of 2-hydroxyethyl acrylate, 0.4 parts by weight of 2,2'-azobisisobutyronitrile as a polymerization initiator, and 312 parts by weight of ethyl acetate as a solvent were added to a four-neck flask equipped with a stirring blade, a thermometer, a nitrogen gas inlet tube and a condenser, and then, a nitrogen gas was introduced thereto while gently stirring, and after that, a polymerization reaction was performed for 6 hours by keeping the liquid temperature in the flask at near 65° C. to thereby prepare an acrylic polymer solution (40 wt %). The weight average molecular weight of this acrylic polymer was 540,000, the glass transition temperature (Tg) was −68° C., and the acid value was 0.0.

The acrylic polymer solution (40 wt %) obtained above was diluted with ethyl acetate to 20 wt %, and per 100 parts by weight of the solid content in this solution, 0.3 parts by weight of ammonium polyoxyethylene nonylpropenylphenyl ether sulfate ("AQUARON HS-10", trade name, produced by Dai-ichi Kogyo Seiyaku Co., Ltd.) as an anionic surfactant, 3 parts by weight of an isocyanurate form of hexamethylene diisocyanate ("CORONATE HX", trade name, produced by Nippon Polyurethane Industry Co., Ltd) as a crosslinking agent, and 0.03 parts by weight of dibutyltin dilaurate ("OL-1", trade name, produced by Tokyo Fine Chemical Co., Ltd., a 0.5 wt % ethyl acetate solution) as a crosslinking catalyst, and acetylacetone as a crosslinking retardant in an amount of 3 parts by weight based on the amount of all solvents were added and mixed with stirring to thereby prepare an acrylic pressure-sensitive adhesive composition.

The acrylic pressure-sensitive adhesive solution obtained above was coated on a polyethylene terephthalate film and heated at 130° C. for 20 seconds to thereby form a pressure-sensitive adhesive layer having a thickness of 10 μm. Subsequently, onto the surface of this pressure-sensitive adhesive layer, a silicone-treated surface of a polyethylene terephthalate film (thickness: 25 μm) whose one surface had been subjected to a silicone treatment, was laminated to produce a pressure-sensitive adhesive sheet.

Example 2

An acrylic pressure-sensitive adhesive composition and pressure-sensitive adhesive sheet were produced in the same manner as in Example 1 except that 0.7 parts by weight of ammonium polyoxyethylene nonylpropenylphenyl ether sulfate ("AQUARON HS-10", trade name, produced by Dai-ichi Kogyo Seiyaku Co., Ltd.) as an anionic surfactant was added per 100 parts by weight of the solid content in the acrylic polymer solution diluted to 20 wt %.

Example 3

An acrylic pressure-sensitive adhesive composition and pressure-sensitive adhesive sheet were produced in the same manner as in Example 1 except that 2 parts by weight of ammonium polyoxyethylene nonylpropenylphenyl ether sulfate ("AQUARON HS-10", trade name, produced by Dai-ichi Kogyo Seiyaku Co., Ltd.) as an anionic surfactant was added per 100 parts by weight of the solid content in the acrylic polymer solution diluted to 20 wt %.

Example 4

An acrylic pressure-sensitive adhesive composition and a pressure-sensitive adhesive sheet were produced in the same manner as in Example 1 except that sodium dioctylsulfosuccinate ("NEOCOL P", trade name, produced by Dai-ichi Kogyo Seiyaku Co., Ltd.) as an anionic surfactant was used in place of ammonium polyoxyethylene nonylpropenylphenyl ether sulfate ("AQUARON HS-10", trade name, produced by Dai-ichi Kogyo Seiyaku Co., Ltd.).

Example 5

An acrylic pressure-sensitive adhesive composition and pressure-sensitive adhesive sheet were produced in the same manner as in Example 4 except that 0.5 parts by weight of sodium dioctylsulfosuccinate ("NEOCOL P", trade name, produced by Dai-ichi Kogyo Seiyaku Co., Ltd.) as an anionic surfactant was added per 100 parts by weight of the solid content in the acrylic polymer solution diluted to 20 wt %.

Example 6

An acrylic pressure-sensitive adhesive composition and pressure-sensitive adhesive sheet were produced in the same manner as in Example 4 except that 1 parts by weight of sodium dioctylsulfosuccinate ("NEOCOL P", trade name, produced by Dai-ichi Kogyo Seiyaku Co., Ltd.) as an anionic surfactant was added per 100 parts by weight of the solid content in the acrylic polymer solution diluted to 20 wt %.

Example 7

An acrylic pressure-sensitive adhesive composition and pressure-sensitive adhesive sheet were produced in the same manner as in Example 4 except that 3 parts by weight of sodium dioctylsulfosuccinate ("NEOCOL P", trade name, produced by Dai-ichi Kogyo Seiyaku Co., Ltd.) as an anionic surfactant was added per 100 parts by weight of the solid content in the acrylic polymer solution diluted to 20 wt %.

Example 8

An acrylic pressure-sensitive adhesive composition and pressure-sensitive adhesive sheet were produced in the same manner as in Example 1 except that 0.5 parts by weight of ammonium polyoxyethylene styrenated phenyl ether sulfate ("HITENOL NF-13", trade name, produced by Dai-ichi Kogyo Seiyaku Co., Ltd.) as an anionic surfactant was used in place of 0.3 parts by weight of ammonium polyoxyethylene nonylpropenylphenyl ether sulfate ("AQUARON HS-10", trade name, produced by Dai-ichi Kogyo Seiyaku Co., Ltd.).

Example 9

An acrylic pressure-sensitive adhesive composition and pressure-sensitive adhesive sheet were produced in the same manner as in Example 1 except that 0.5 parts by weight of ammonium polyoxyethylene styrenated phenyl ether sulfate ("HITENOL NF-17", trade name, produced by Dai-ichi Kogyo Seiyaku Co., Ltd.) as an anionic surfactant was used in place of 0.3 parts by weight of ammonium polyoxyethylene nonylpropenylphenyl ether sulfate ("AQUARON HS-10", trade name, produced by Dai-ichi Kogyo Seiyaku Co., Ltd.).

Example 10

An acrylic pressure-sensitive adhesive composition and pressure-sensitive adhesive sheet were produced in the same manner as in Example 1 except that 0.5 parts by weight of ammonium polyoxyethylene-1-(allyloxymethyl)alkyl ether sulfate ("AQUARON KH-10", trade name, produced by Dai-ichi Kogyo Seiyaku Co., Ltd.) was used in place of 0.3 parts by weight of ammonium polyoxyethylene nonylpropenylphenyl ether sulfate ("AQUARON HS-10", trade name, produced by Dai-ichi Kogyo Seiyaku Co., Ltd.).

Comparative Example 1

An acrylic pressure-sensitive adhesive composition and a pressure-sensitive adhesive sheet were produced in the same manner as in Example 1 except that a surfactant was not added.

Comparative Example 2

An acrylic pressure-sensitive adhesive composition and pressure-sensitive adhesive sheet were produced in the same manner as in Example 1 except that 0.1 parts by weight of ammonium polyoxyethylene nonylpropenylphenyl ether sulfate ("AQUARON HS-10", trade name, produced by Dai-ichi Kogyo Seiyaku Co., Ltd.) as an anionic surfactant was added per 100 parts by weight of the solid content in the acrylic polymer solution diluted to 20 wt %.

Comparative Example 3

An acrylic pressure-sensitive adhesive composition and pressure-sensitive adhesive sheet were produced in the same manner as in Example 1 except that 5 parts by weight of ammonium polyoxyethylene nonylpropenylphenyl ether sulfate ("AQUARON HS-10", trade name, produced by Dai-ichi Kogyo Seiyaku Co., Ltd.) as an anionic surfactant was added per 100 parts by weight of the solid content in the acrylic polymer solution diluted to 20 wt %.

Comparative Example 4

An acrylic pressure-sensitive adhesive composition and pressure-sensitive adhesive sheet were produced in the same manner as in Example 4 except that 0.1 parts by weight of sodium dioctylsulfosuccinate ("NEOCOL P", trade name, produced by Dai-ichi Kogyo Seiyaku Co., Ltd.) as an anionic surfactant was added per 100 parts by weight of the solid content in the acrylic polymer solution diluted to 20 wt %.

Comparative Example 5

An acrylic pressure-sensitive adhesive composition and pressure-sensitive adhesive sheet were produced in the same manner as in Example 4 except that 5 parts by weight of sodium dioctylsulfosuccinate ("NEOCOL P", trade name, produced by Dai-ichi Kogyo Seiyaku Co., Ltd.) as an anionic surfactant was added per 100 parts by weight of the solid content in the acrylic polymer solution diluted to 20 wt %.

Comparative Example 6

An acrylic pressure-sensitive adhesive composition and pressure-sensitive adhesive sheet were produced in the same manner as in Example 1 except that in place of adding 0.3 parts by weight of ammonium polyoxyethylene nonylpropenylphenyl ether sulfate ("AQUARON HS-10", trade name, produced by Dai-ichi Kogyo Seiyaku Co., Ltd.) as an anionic surfactant, 1 part by weight of polyoxyalkylene alkenyl ether ("LATEMUL PD-420", trade name, produced by Kao Corporation) as a nonionic surfactant was added per 100 parts by weight of the solid content in the acrylic polymer solution diluted to 20 wt %.

Comparative Example 7

An acrylic pressure-sensitive adhesive composition and pressure-sensitive adhesive sheet were produced in the same manner as in Example 1 except that in place of adding 0.3 parts by weight of ammonium polyoxyethylene nonylpropenylphenyl ether sulfate ("AQUARON HS-10", trade name, produced by Dai-ichi Kogyo Seiyaku Co., Ltd.) as an anionic surfactant and 3 parts by weight of an isocyanurate form of hexamethylene diisocyanate ("CORONATE HX", trade name, produced by Nippon Polyurethane Industry Co., Ltd) as a crosslinking agent, 0.7 parts by weight of "ADEKA PLURONIC 25R-1" (trade name, produced by ADEKA Corporation) as a nonionic surfactant and 4 parts by weight of an isocyanurate form of hexamethylene diisocyanate ("CORONATE HX", trade name, produced by Nippon Polyurethane Industry Co., Ltd) as a crosslinking agent were added per 100 parts by weight of the solid content in the acrylic polymer solution diluted to 20 wt %.

(Evaluation)

The pressure-sensitive adhesive sheets obtained in Examples and Comparative Examples were evaluated for the water contact angle, the pressure-sensitive adhesive strength of pressure-sensitive adhesive tape B, the wettability with the interlayer and the adherence of the interlayer filler. The evaluation methods are described below. The evaluation results are shown in Table 1.

(1) Water Contact Angle

The pressure-sensitive adhesive sheet was laminated to the surface of an adherend (hardcoat film) at a temperature of 23° C. and a humidity of 30%, the pressure-sensitive adhesive sheet was then tightly adhered to the adherend in an autoclave by treating under the conditions of a temperature of 50° C., a pressure of 5 atm and a time of 15 minutes, the pressure-sensitive adhesive sheet and adherend, that had been tightly adhered to each other, was then left to stand at a temperature of 23° C. and a humidity of 30% for 12 hours, and then, the pressure-sensitive adhesive sheet was separated from the adherend. Using a water contact angle measuring apparatus ("DM700", trade name, manufactured by Kyowa Interface Science Co. Ltd.), in accordance with a droplet method, about 2.8 µL of a waterdrop was dropped on the adherend surface from which the pressure-sensitive adhesive sheet had been separated, in an atmosphere of a temperature of 23° C. and a humidity of 30% RH, and 1 second after the dropping, the angle between the adherend surface and a tangent at the end boundary of the waterdrop dropped was measured and taken as the "water contact angle (°)". The sample was rated "good (A)" when the water contact angle was 70° or less, and rated "bad (B)" when the water contact angle was more than 70°.

The water contact angle of an adherend not subjected to any treatment was 87.6°. That is, the adherend used in this evaluation is a hardcoat film having a water contact angle of 87.6°.

(2) Pressure-Sensitive Adhesive Strength of Pressure-Sensitive Adhesive Tape B

The pressure-sensitive adhesive sheet was laminated to the surface of an adherend (hardcoat film) at a temperature of 23° C. and a humidity of 30%, the pressure-sensitive adhesive sheet was then tightly adhered to the adherend in an autoclave by treating under the conditions of a temperature of 50° C., a pressure of 5 atm and a time of 15 minutes, the pressure-sensitive adhesive sheet and adherend, that had been tightly adhered to each other, was then left to stand at a temperature of 23° C. and a humidity of 30% for 12 hours, and then, the pressure-sensitive adhesive sheet was separated from the adherend. After that, the pressure-sensitive adhesive surface of a piece of a pressure-sensitive adhesive tape B (substrate thickness: 25 µm) having a length of 70 mm and a width of 19 mm was laminated to the adherend surface from which the pressure-sensitive adhesive sheet had been separated, at a temperature of 23° C. and a humidity of 30%, the piece of the pressure-sensitive adhesive tape B and the adherend were then attached by pressing under 0.25 MPa at 300 mm/min, and the piece of the pressure-sensitive adhesive tape B and adherend, that had been attached to each other, were then left to stand at a temperature of 23° C. and a humidity of 30% for 30 minutes. Thereafter, the 180° peel pressure-sensitive adhesive strength (temperature: 23° C., humidity: 30% RH, peel angle: 180°, tensile speed: 300 mm/min) (N/19 mm) was measured using a tensile tester, and the obtained value was taken as "Pressure-Sensitive Adhesive Strength (N/19 mm) of Pressure-Sensitive Adhesive Tape B".

The pressure-sensitive adhesive strength (N/19 mm) of the pressure-sensitive adhesive tape B to an adherend not subjected to any treatment was 6.91 N/19 mm.

The sample was rated "good (A)" when the pressure-sensitive adhesive strength (N/19 mm) of the pressure-sensitive adhesive tape B to the adherend after separating the pressure-sensitive adhesive sheet was more than 6.91 N/19 mm, and rated "bad (B)" when the pressure-sensitive adhesive strength was 6.91 N/19 mm or less.

The adherend used in this evaluation is the same as the adherend used in the evaluation of "(1) Water Contact Angle" above.

Here, the pressure-sensitive adhesive tape B was prepared as follows: 100 parts by weight of butyl acrylate, 5 parts by weight of acrylic acid, 0.2 parts by weight of benzoyl peroxide as a polymerization initiator, and 265 parts by weight of toluene as a solvent were added to a four-neck flask equipped with a stirring blade, a thermometer, a nitrogen gas inlet tube and a condenser, and then, a nitrogen gas was introduced thereto while gently stirring, and after that, a polymerization reaction was performed for 6 hours by keeping the liquid temperature in the flask at near 62° C. to thereby prepare an acrylic polymer solution (29 wt %). The weight average molecular weight of this acrylic polymer was 600,000, and degree of dispersion (Mw/Mn) thereof was 13.

Per 100 parts by weight of the solid content in this acrylic polymer solution, 1.5 parts by weight of melamine resin ("SUPER BECKAMINE J-820-60", trade name, produced by DIC Corporation), 3 parts by weight of a crosslinking agent ("CORONATE L", trade name, produced by Nippon Polyurethane Industry Co., Ltd) were added thereto, followed by mixing with stirring to thereby prepare an acrylic pressure-sensitive adhesive composition.

The acrylic pressure-sensitive adhesive solution obtained above was coated on a polyethylene terephthalate film having a thickness of 25 μm, followed by heat-drying to form a pressure-sensitive adhesive layer having a thickness of 28 μm, thereby forming a pressure-sensitive adhesive tape B.

In this regard, the pressure-sensitive adhesive tape B thus obtained was cut into a size of 19 mm×250 mm, and the cut pressure-sensitive adhesive tape B was contact-bonded to a stainless steel by moving a 2-kg roller back and forth once at a rate of 5 mm/sec, followed by subjecting to aging for 30 minutes. When the cut pressure-sensitive adhesive tape B was peeled from the stainless steel under the condition of a peeling angle of 180° and tensile speed of 300 mm/min, the pressure-sensitive adhesive strength of the pressure-sensitive adhesive tape B was 5.5 N/19 mm.

(3) Wettability with Interlayer Filler

The pressure-sensitive adhesive sheet was laminated to the surface of an adherend at a temperature of 23° C. and a humidity of 30%, the pressure-sensitive adhesive sheet was tightly adhered to the adherend in an autoclave by treating under the conditions of a temperature of 50° C., a pressure of 5 atm and a time of 15 minutes, and the pressure-sensitive adhesive sheet and adherend, that had been tightly adhered to each other, were then left to stand at a temperature of 23° C. and a humidity of 30% for 12 hours. Thereafter, the adherend having attached thereto the pressure-sensitive adhesive sheet was cut into a size having a length of 40 mm and a width of 40 mm and laminated to a glass plate of 50 mm in length and 50 mm in width, and the glass plate was fixed to a spin coater ("K-359SD1", trade name, manufactured by Kyowa Riken Co., Ltd.). After peeling off the pressure-sensitive adhesive sheet from the adherend, 4 ml of "SVR7000 SERIES" (trade name, produced by Dexerials Corporation) as an interlayer filler was coated on the adherend surface from which the pressure-sensitive adhesive sheet had been separated, and then, the adherend was rotated at 1,500 rpm for 15 seconds to uniformly spread the interlayer filler. The adherend was left to stand at a temperature of 23° C. and a humidity of 30% for 1 hour, and the distance for which the interlayer filler was repelled from the edge of the adherend was measured.

The same measurement was performed using "WORLD ROCK HRJ-21" (trade name, manufactured by Kyowa Riken Co., Ltd.).

The sample was rated "good (A)" when the distance for which repelled from the edge was less than 2 mm in both cases of using the interlayer fillers "SVR7000 SERIES" and "WORLD ROCK HRJ-21", and rated "bad (B)" when the distance for which repelled from the edge was 2 mm or more in either one case or both cases of using the interlayer fillers.

In this connection, the rating of the adherend not subjected to any treatment was "bad (B)". The adherend used in this evaluation is the same as the adherend used in the evaluation of "(1) Water Contact Angle" above.

(4) Adherence of Interlayer Filler

The pressure-sensitive adhesive sheet was laminated to the surface of an adherend at a temperature of 23° C. and a humidity of 30%, the pressure-sensitive adhesive sheet was then tightly attached to the adherend in an autoclave by treating under the conditions of a temperature of 50° C., a pressure of 5 atm and a time of 15 minutes, the pressure-sensitive adhesive sheet and adherend, that had been tightly attached to each other, were then left to stand at a temperature of 23° C. and a humidity of 30% for 12 hours, and thereafter, the pressure-sensitive adhesive sheet was separated.

An interlayer filler ("SVR7000 SERIES", trade name, produced by Dexerials Corporation) was coated on the adherend surface from which the pressure-sensitive adhesive sheet had been separated, to a thickness of 100 μm by using an applicator, and a PET film was put thereon so as to prevent the interlayer filler from contacting with air. Subsequently, the interlayer filler was cured by the irradiation with UV of 5,000 mJ or more. After curing, the laminate was cut into a size of 70 mm in length and 25 mm in width. The 180° peel pressure-sensitive adhesive strength (temperature: 23° C., humidity: 30% RH, peel angle: 180°, tensile speed: 300 mm/min) (N/25 mm) of the layer composed of the interlayer filler to the adherend was measured by using a tensile tester.

The same measurement was performed using "WORLD ROCK HRJ-21" (trade name, manufactured by Kyowa Riken Co., Ltd.) as the interlayer filler.

On the other hand, the light release separator of an optical transparent pressure-sensitive adhesive tape ("LUCIACS CS9886U", trade name, produced by Nitto Denko Corporation) was separated, and a PET film was laminated to prepare an optical transparent pressure-sensitive adhesive tape cut into a size having a length of 70 mm and a width of 25 mm. The heavy release separator of the optical transparent pressure-sensitive adhesive tape was separated, and using the adherend after separating the pressure-sensitive adhesive sheet in the same manner as above, the pressure-sensitive adhesive surface of the optical transparent pressure-sensitive adhesive tape was laminated to the adherend surface from which the pressure-sensitive adhesive sheet had been separated, under the conditions of a temperature of 23° C. and a humidity of 30%, they were adhered by pressing under 0.25 MPa at 300 mm/min, and then, they were left to stand at a temperature of 23° C. and a humidity of 30% for 30 minutes. Thereafter, the 180° peel pressure-sensitive adhesive strength (temperature: 23° C., humidity: 30% RH, peel angle: 180°, tensile speed: 300 mm/min) (N/25 mm) of the optical transparent pressure-sensitive adhesive tape to the adherend was measured using a tensile tester.

The adherence of the interlayer filler was rated "good (A)" when the 180° peel pressure-sensitive adhesive strength of the layer composed of the interlayer filler to the adherend was more than 1.47 N/25 mm and the 180° peel pressure-sensitive adhesive strength of the optical transparent adhesive tape to the adherend was more than 16.7 N/25 mm (the 180° peel pressure-sensitive adhesive strength of the layer composed of "SVR7000 SERIES" (trade name) to the adherend surface from which the pressure-sensitive adhesive sheet had been separated was higher than the 180° peel pressure-sensitive adhesive strength of the layer composed of "SVR7000 SERIES" (trade name) to the adherend not subjected to any treatment, the 180° peel pressure-sensitive adhesive strength of the layer composed of "WORLD ROCK HRJ-21" (trade name) to the adherend surface from which the pressure-sensitive adhesive sheet had been separated was higher than the 180° peel pressure-sensitive adhesive strength of the layer composed of "WORLD ROCK HRJ-21" (trade name) to the adherend not subjected to any treatment, and the 180° peel pressure-sensitive adhesive strength of the optical transparent pressure-sensitive adhesive tape to the adherend surface from which the pressure-sensitive adhesive sheet had been separated was higher than the 180° peel pressure-sensitive adhesive strength to the adherend not subjected to any treatment), and rated "bad (B)" when the 180° peel pressure-sensitive adhesive strength of the layer composed of the interlayer filler to the adherend was 1.47 N/25 mm or less and/or the 180° peel pressure-sensitive adhesive strength of the optical transparent pressure-sensitive adhesive tape to the adherend was 16.7 N/25 mm or less.

In this connection, the 180° peel pressure-sensitive adhesive strength of the layer composed of "SVR7000 SERIES" (trade name) to the adherend not subjected to any treatment was 1.47 N/25 mm.

Also, the 180° peel pressure-sensitive adhesive strength of the optical transparent pressure-sensitive adhesive tape to the adherend not subjected to any treatment was 16.7 N/25 mm. The adherend used in this evaluation is the same as the adherend used in the evaluation of "(1) Water Contact Angle" above.

This application is based on Japanese Patent Application No. 2013-073361 filed on Mar. 29, 2013 and Japanese Patent Application No. 2013-249793 filed on Dec. 3, 2013, the entire subject matters of which are incorporated herein by reference.

What is claimed is:

1. A pressure-sensitive adhesive layer, comprising a base polymer and having properties of (1) and (2) below:

(1) in a case where a pressure-sensitive adhesive sheet A having the pressure-sensitive adhesive layer is laminated to a surface of the following adherend X at a temperature of 23° C. and a humidity of 30%, the pressure-sensitive adhesive sheet A is then tightly adhered to

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Pressure-sensitive adhesive composition | Acrylic polymer (parts by weight) | | 100 | 100 | 100 | 100 | 100 | 100 | 100 | 100 | 100 | 100 |
| | Crosslinking agent (parts by weight) | CORONATE HX | 3 | 3 | 3 | 3 | 3 | 3 | 3 | 3 | 3 | 3 |
| | Crosslinking catalyst (parts by weight) | OL-1 | 0.03 | 0.03 | 0.03 | 0.03 | 0.03 | 0.03 | 0.03 | 0.03 | 0.03 | 0.03 |
| | Crosslinking retardant (parts by weight) | acetylacetone | 3 | 3 | 3 | 3 | 3 | 3 | 3 | 3 | 3 | 3 |
| | Surfactant (parts by weight) | AQUARON HS-10 | 0.3 | 0.7 | 2 | | | | | | | |
| | | NEOCOL P | | | | 0.3 | 0.5 | 1 | 1 | | | |
| | | HITENOL NF-13 | | | | | | | | 0.5 | | |
| | | HITENOL NF-17 | | | | | | | | | 0.5 | |
| | | AQUARON KH-10 | | | | | | | | | | 0.5 |
| | | LATEMUL PD-420 | | | | | | | | | | |
| | | ADEKA PLURONIC 25R-1 | | | | | | | | | | |
| Water contact angle (°) | | | 67.7 | 61.2 | 56.4 | 68.1 | 67.3 | 66.2 | 69.9 | 68.1 | 67.8 | 64.8 |
| | | | A | A | A | A | A | A | A | A | A | A |
| Pressure-sensitive adhesive strength (N/19 mm) of pressure-sensitive adhesive tape B | | | 7.05 | 7.38 | 7.52 | 7.11 | 7.07 | 7.43 | 7.00 | 7.25 | 7.02 | 7.18 |
| | | | A | A | A | A | A | A | A | A | A | A |
| Wettability with interlayer filler | | | A | A | A | A | A | A | A | A | A | A |
| Adherence of interlayer filler | | | A | A | A | A | A | A | A | A | A | A |

| | | | Comparative Example | | | | | | |
|---|---|---|---|---|---|---|---|---|---|
| | | | 1 | 2 | 3 | 4 | 5 | 6 | 7 |
| Pressure-sensitive adhesive composition | Acrylic polymer (parts by weight) | | 100 | 100 | 100 | 100 | 100 | 100 | 100 |
| | Crosslinking agent (parts by weight) | CORONATE HX | 3 | 3 | 3 | 3 | 3 | 3 | 4 |
| | Crosslinking catalyst (parts by weight) | OL-1 | 0.03 | 0.03 | 0.03 | 0.03 | 0.03 | 0.03 | 0.03 |
| | Crosslinking retardant (parts by weight) | acetylacetone | 3 | 3 | 3 | 3 | 3 | 3 | 3 |
| | Surfactant (parts by weight) | AQUARON HS-10 | | | 0.1 | 5 | | | |
| | | NEOCOL P | | | | | 0.1 | 5 | |
| | | HITENOL NF-13 | | | | | | | |
| | | HITENOL NF-17 | | | | | | | |
| | | AQUARON KH-10 | | | | | | | |
| | | LATEMUL PD-420 | | | | | | | 1 |
| | | ADEKA PLURONIC 25R-1 | | | | | | | 0.7 |
| Water contact angle (°) | | | 75.5 | 74.4 | 38.1 | 74.4 | 46.9 | 69.0 | 70.4 |
| | | | B | B | A | B | A | A | B |
| Pressure-sensitive adhesive strength (N/19 mm) of pressure-sensitive adhesive tape B | | | 7.02 | 7.19 | 6.80 | 7.36 | 6.40 | 6.20 | 7.01 |
| | | | A | A | B | A | B | B | A |
| Wettability with interlayer filler | | | B | B | A | B | A | A | B |
| Adherence of interlayer filler | | | A | A | B | A | B | B | A |

While the invention has been described in detail and with reference to specific embodiments thereof, it will be apparent to one skilled in the art that various changes and modifications can be made therein without departing from the spirit and scope thereof.

the adherend X in an autoclave under the conditions of a temperature of 50° C., a pressure of 5 atm and a time of 15 minutes, the pressure-sensitive adhesive sheet A and adherend X, that have been tightly adhered to each other, is then left to stand at a temperature of 23° C. and a humidity of 30% for 12 hours, and then, the pressure-sensitive adhesive sheet A is separated from the adherend X, a water contact angle A on the surface of the adherend X from which the pressure-sensitive adhesive sheet A has been separated is 70° or less; and (2) in a case where a pressure-sensitive adhesive sheet A having the pressure-sensitive adhesive layer is laminated to a surface of the following adherend X at a temperature of 23° C. and a humidity of 30%, the pressure-sensitive adhesive sheet A is then tightly adhered to the adherend X in an autoclave under the conditions of a temperature of 50° C., a pressure of 5 atm and a time of 15 minutes, the pressure-sensitive adhesive sheet A and adherend X, that have been tightly adhered to each other, is then left to stand at a temperature of 23° C. and a humidity of 30% for 12 hours, and then, the pressure-sensitive adhesive sheet A is separated from the adherend X, a pressure-sensitive adhesive strength of a pressure-sensitive adhesive tape B having a substrate having a thickness of 25 µm with respect to the surface of the adherend X from which the pressure-sensitive adhesive sheet A has been separated is higher than a pressure-sensitive adhesive strength of the pressure-sensitive adhesive tape B having a substrate having a thickness of 25 µm with respect to a surface of the following adherend X, wherein the pressure-sensitive adhesive strength is measured under the condition of a peel angle of 180° and a tensile speed of 300 mm/min:

Adherend X: a hardcoat film having a water contact angle of 80° or more and 100° or less.

2. The pressure-sensitive adhesive layer according to claim 1, comprising an acrylic polymer as the base polymer.

3. The pressure-sensitive adhesive layer according to claim 2, further comprising an anionic surfactant.

4. The pressure-sensitive adhesive layer according to claim 3, wherein a content of the anionic surfactant is from 0.2 to 4 parts by weight per 100 parts by weight of the base polymer.

5. A pressure-sensitive adhesive sheet, comprising the pressure-sensitive adhesive layer according to claim 1.

6. A pressure-sensitive adhesive sheet, comprising the pressure-sensitive adhesive layer according to claim 2.

7. A pressure-sensitive adhesive sheet, comprising the pressure-sensitive adhesive layer according to claim 3.

8. A pressure-sensitive adhesive sheet, comprising the pressure-sensitive adhesive layer according to claim 4.

* * * * *